(12) United States Patent
Tomikawa et al.

(10) Patent No.: US 10,999,769 B2
(45) Date of Patent: May 4, 2021

(54) RADIO COMMUNICATION SYSTEM, BASE STATION APPARATUS, AND CONTROL INFORMATION TRANSMISSION METHOD

(71) Applicant: FUJITSU LIMITED, Kawasaki (JP)

(72) Inventors: Tadato Tomikawa, Sapporo (JP); Takayoshi Ode, Yokohama (JP); Kimio Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 16/269,145

(22) Filed: Feb. 6, 2019

(65) Prior Publication Data

US 2019/0174369 A1 Jun. 6, 2019

Related U.S. Application Data

(63) Continuation of application No. PCT/JP2016/075553, filed on Aug. 31, 2016.

(51) Int. Cl.
| | |
|---|---|
| *H04W 36/08* | (2009.01) |
| *H04W 36/00* | (2009.01) |
| *H04W 92/20* | (2009.01) |
| *H04L 29/06* | (2006.01) |
| *H04W 48/08* | (2009.01) |

(52) U.S. Cl.
CPC ....... *H04W 36/0055* (2013.01); *H04L 65/608* (2013.01); *H04W 36/08* (2013.01); *H04W 92/20* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 2008/0318578 A1 | 12/2008 | Worrall | |
| 2013/0336289 A1* | 12/2013 | Koifman | H04W 24/02 370/331 |

(Continued)

FOREIGN PATENT DOCUMENTS

| | | |
|---|---|---|
| EP | 3 209 060 A1 | 8/2017 |
| JP | 2010-530684 A | 9/2010 |

(Continued)

OTHER PUBLICATIONS

International Search Report issued by the Japan Patent Office for corresponding International Patent Application No. PCT/JP2016/075553, dated Nov. 15, 2016, with an English translation.

(Continued)

*Primary Examiner* — Jenkey Van
(74) *Attorney, Agent, or Firm* — Myers Wolin, LLC

(57) ABSTRACT

A radio communication system, a first application server includes a communicator configured to transmit to and receive from a terminal apparatus individual data via a first base station apparatus, the first base station apparatus includes a first controller configured to request to a second base station apparatus first control information regarding to a second application server connected to the second base station apparatus and second control information for the terminal apparatus to connect to the second base station apparatus, and a transmitter configured to transmit to the terminal apparatus the second control information notified from the second base station apparatus, at least, the second base station apparatus includes a second controller configured to notify the first and second control information to the first base station apparatus, the terminal apparatus receives at least the second control information from the first base station apparatus.

20 Claims, 23 Drawing Sheets

(56) References Cited

U.S. PATENT DOCUMENTS

| | | | |
|---|---|---|---|
| 2014/0106811 A1 | 4/2014 | Iwabuchi | |
| 2014/0280470 A1* | 9/2014 | Calo | H04L 67/142 |
| | | | 709/203 |
| 2017/0245184 A1* | 8/2017 | Nagesh Shetigar | |
| | | | H04W 36/023 |
| 2018/0035360 A1 | 2/2018 | Rasanen | |
| 2018/0242204 A1* | 8/2018 | Zhu | H04W 36/00 |
| 2019/0028934 A1* | 1/2019 | Rasanen | H04W 36/12 |
| 2019/0045409 A1* | 2/2019 | Rasanen | H04W 36/12 |
| 2019/0090169 A1* | 3/2019 | Lu | H04W 8/08 |
| 2019/0116534 A1* | 4/2019 | Kaptchouang | H04W 76/20 |

FOREIGN PATENT DOCUMENTS

| | | |
|---|---|---|
| JP | 2012-249113 A | 12/2012 |
| JP | 2017-17655 A | 1/2017 |
| JP | 2017-536728 A | 12/2017 |
| WO | 2011/032732 A1 | 3/2011 |
| WO | 2015/099587 A1 | 7/2015 |
| WO | 2016/058384 A1 | 4/2016 |
| WO | 2016/128055 A1 | 8/2016 |

OTHER PUBLICATIONS

Written Opinion of the International Searching Authority issued for corresponding International Patent Application No. PCT/JP2016/075553, dated Nov. 15, 2016, with an English translation.

Notice of Reasons for Refusal issued by the Japan Patent Office for corresponding Japanese Patent Application No. 2018-536598, dated Apr. 7, 2020, with a full English machine translation.

Decision of Refusal issued by the Japan Patent Office for corresponding Japanese Patent Application No. 2018-536598, mailed on Jun. 23, 2020, with a full English machine translation.

* cited by examiner

FIG. 10

Handover Request

| IE/Group Name | Presence | Range | IE type and reference | Semantics description |
|---|---|---|---|---|
| Message Type | M | | 9.2.1.1 | |
| MME UE S1AP ID | M | | 9.2.3.3 | |
| Handover Type | M | | 9.2.1.13 | |
| Cause | M | | 9.2.1.3 | |
| UE Aggregate Maximum Bit Rate | M | | 9.2.1.20 | |
| E-RABs To Be Setup List | | 1 | | |
| >E-RABs To Be Setup Item IEs | | 1 .. <maxnoofE-RABs> | | |
| >>E-RAB ID | M | | 9.2.1.2 | |
| >>Transport Layer Address | M | | 9.2.2.1 | |
| >>GTP-TEID | M | | 9.2.2.2 | To deliver UL PDUs. |
| >>E-RAB Level QoS Parameters | M | | 9.2.1.15 | Includes necessary QoS parameters. |
| >>Data Forwarding Not Possible | O | | 9.2.1.76 | |
| Source to Target Transparent Container | M | | 9.2.1.56 | |
| UE Security Capabilities | M | | 9.2.1.40 | |
| Handover Restriction List | O | | 9.2.1.22 | |
| Trace Activation | O | | 9.2.1.4 | |
| Request Type | O | | 9.2.1.34 | |
| SRVCC Operation Possible | O | | 9.2.1.58 | |
| Security Context | M | | 9.2.1.26 | |
| NAS Security Parameters to E-UTRAN | C-iffromUTRANGERAN | | 9.2.3.31 | The eNB shall use this IE as specified in TS 33.401 [15]. |
| CSG Id | O | | 9.2.1.62 | |
| CSG Membership Status | O | | 9.2.1.73 | |
| GUMMEI | O | | 9.2.3.9 | This IE indicates the MME serving the UE. |
| MME UE S1AP ID 2 | O | | 9.2.3.3 | This IE indicates the MME UE S1AP ID assigned by the MME. |
| Management Based MDT Allowed | O | | 9.2.1.83 | |
| Management Based MDT PLMN List | O | | MDT PLMN List 9.2.1.89 | |
| Masked IMEISV | O | | 9.2.3.38 | |
| Expected UE Behaviour | O | | 9.2.1.96 | |
| ProSe Authorized | O | | 9.2.1.99 | |
| NW Capability Request condition | | | | |

FIG. 11

| IE/Group Name | Presence | Range | IE type and reference | Semantics description |
|---|---|---|---|---|
| Message Type | M | | 9.2.1.1 | |
| MME UE S1AP ID | M | | 9.2.3.3 | |
| eNB UE S1AP ID | M | | 9.2.3.4 | Allocated at the target eNB. |
| E-RABs Admitted List | | 1 | | |
| >E-RABs Admitted Item IEs | | 1 .. <maxnoofE-RABs> | | |
| >>E-RAB ID | M | | 9.2.1.2 | |
| >>Transport Layer Address | M | | 9.2.2.1 | |
| >>GTP-TEID | M | | 9.2.2.2 | To deliver DL PDUs. |
| >>DL Transport Layer Address | O | | 9.2.2.1 | |
| >>DL GTP-TEID | O | | 9.2.2.2 | To deliver forwarded DL PDCP SDUs. |
| >>UL Transport Layer Address | O | | 9.2.2.1 | |
| >>UL GTP-TEID | O | | 9.2.2.2 | To deliver forwarded UL PDCP SDUs. |
| E-RABs Failed to Setup List | O | | E-RAB List 9.2.1.36 | A value for *E-RAB ID* shall only be present once in *E-RABs Admitted List* IE and *E-RABs Failed to Setup List* IE. |
| Target to Source Transparent Container | M | | 9.2.1.57 | |
| CSG Id | O | | 9.2.1.62 | |
| Criticality Diagnostics | O | | 9.2.1.21 | |
| Cell Access Mode | O | | 9.2.1.74 | |
| NW Capability | | | | |

FIG. 12

| Information Element/Group name | Need | Multi | Type and reference | Semantics description |
|---|---|---|---|---|
| UTRAN mobility information elements | | | | |
| URA identity list | MP | 1 ..<maxURA> | | |
| >URA identity | MP | | URA identity 10.3.2.6 | |
| NW capability | | | | |

FIG. 14

| DESTINATION CANDIDATE | CONNECTION INFORMATION | ROUTE INFORMATION | TRANSMISSION DELAY INFORMATION | SUPPORTED SERVICE |
|---|---|---|---|---|
| APPLICATION SERVER A | IP ADDRESS: 11.22.33.44 | ARRANGEMENT ROUTE 1: PGW(x)-SGW(y)-eNB(A) | DELAY STATE ROUTE 1: 10ms | ·VIDEO DISTRIBUTION A ·VIDEO DISTRIBUTION B |
| APPLICATION SERVER B | IP ADDRESS: 11.22.33.55 | ARRANGEMENT ROUTE 1: PGW(x)-SGW(z)-eNB(B) | DELAY STATE ROUTE 1: 15ms | ·VIDEO DISTRIBUTION B |
| · · | · · | · · | · · | · · |
| APPLICATION SERVER X | IP ADDRESS: 11.22.33.99 | ARRANGEMENT (In case of SGW ARRANGEMENT) ROUTE 1: PGW(x)-SGW(z) | DELAY STATE ROUTE 1: 13ms | ·VIDEO DISTRIBUTION A ·VIDEO DISTRIBUTION B ·VIDEO DISTRIBUTION C |

FIG. 20A

| IP | UDP | RTP Header | RTP Payload |

FIG. 20B

| | |
|---|---|
| RR (Receiver Report) | RR IS USED TO TRANSFER INFORMATION RELATED TO RECEPTION QUALITY AT A RECEIVER |
| SR (Sender Report) | SR TRANSFERS STREAM-RELATED INFROMATION FROM A SENDER |
| SDES (Source Description) | TRANSFERS IDENTIFICATION OF PARTICIPANT ON RTP SESSION AND CAPTURE INFROMATION SUCH AS E-MAIL ADDRESS AND TELEPHONE NUMBER |
| BYE | NOTIFIES A PARTICIPANT HAS LEFT THE SESSION |
| ARP (Application-defined) | PREPARED FOR APPLICATION-DEFINED EXTENSIONS |

RADIO COMMUNICATION SYSTEM, BASE STATION APPARATUS, AND CONTROL INFORMATION TRANSMISSION METHOD

CROSS-REFERENCE TO RELATED APPLICATION

This application is a continuation application of International Application PCT/JP2016/075553 filed on Aug. 31, 2016 and designated the U.S., the entire contents of which are incorporated herein by reference.

FIELD

The embodiments discussed herein are related to a radio communication system, a base station apparatus, and a control information transmission method.

BACKGROUND

At present, the 3GPP (3rd Generation Partnership Project) and ETSI (European Telecommunication Standard Institute), organizations of standardization, start to study a successor system of LTE (Long Term Evolution) and LTE-Advanced, as technology for a large capacity and high speed radio communication system. Such a radio communication system is called the 5th Generation mobile communication (5G). In Japan also, a full-scale service using CA (Carrier Aggregation), which is one of LTE-Advanced technologies, has been introduced since 2015, and radio communication at a transmission speed exceeding 200 Mbps is now possible.

In ETSI etc., a study on mobile edge computing is started. The mobile edge computing is a technique in which, for example, an application server is located in the vicinity of a terminal apparatus so that the server provides a service to the terminal apparatus. This enables the reduction of a transmission delay (latency) with the reduction of a load in a network, in comparison with a case when an application server is located outside a network (for example, EPC (Evolved Packet Core)).

In regard to the radio communication system, for example, there is a technique as follows. Namely, in a handover procedure, session state information is inserted into a context data message, so that a source network element transmits the message to a target network element.

It is said that, according to the above technique, a flexible and well-designed solution can be provided for the transfer of a session state between base station apparatuses.

Also, there is provided a mobility managing node which transmits, to a handover destination, application software to provide a service provider to a terminal apparatus at the handover destination.

It is said that, according to the above technique, a network node and a method capable of providing a service to a terminal apparatus can be provided in a radio communication network.

CITATION LIST

Patent Literature

Patent literature 1: International Publication Pamphlet No. WO 2011/032732
Patent literature 2: International Publication Pamphlet No. WO 2015/099587

However, there is a case that, when a terminal apparatus is handed over, an application server connected at a handover source base station apparatus is different from an application server connected at a handover destination base station apparatus. In such a case, for example, when the terminal apparatus receives a video distribution service from an application server and is handed over in the middle of distribution, there may be a case that the terminal apparatus is unable to receive the video distribution continuously from an application server at the handover destination.

In the aforementioned technique in which session state information is transmitted to a target element by a context message, no discussion has been made at all on how to continue the service at the handover even when the target element receives the session state information. Therefore, according to the technique, continuous service provision to the terminal apparatus may be disabled in some cases.

Moreover, in regard to the aforementioned technique of providing application software for providing a service provider to the terminal apparatus at the handover destination also, no discussion has been made at all on how to continue the service at the handover. Therefore, according to such a technique, continuous service provision to the terminal apparatus may be disabled in some cases.

SUMMARY

According to an aspect of the embodiments, a radio communication system including: a first and second base station apparatuses; a first and second application servers; and a terminal apparatus, wherein the first application server includes a communicator configured to transmit to and receive from the terminal apparatus individual data via the first base station apparatus, the first base station apparatus includes a first controller configured to request to the second base station apparatus first control information regarding to the second application server connected to the second base station apparatus and second control information for the terminal apparatus to connect to the second base station apparatus, and a transmitter configured to transmit to the terminal apparatus the second control information notified from the second base station apparatus, at least, the second base station apparatus includes a second controller configured to notify the first and second control information to the first base station apparatus, the terminal apparatus includes a receiver configured to receive at least the second control information from the first base station apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of an information element included in HO Request.

FIG. 11 is a diagram illustrating an example of an information element included in HO Request Ack.

FIG. 12 is a sequence diagram illustrating an example of overall operation.

FIG. 14 is a diagram illustrating an example of network capability information.

FIGS. 20A and 20B are diagrams illustrating an example of a packet configuration and an example of RTCP information, respectively.

DESCRIPTION OF EMBODIMENTS

Hereinafter, the present embodiments will be described in detail by reference to the drawings. However, the problems and the embodiments in the present description are merely examples without intention of limiting the scope of rights of the present application. In particular, even if the expressions of description are different, the technique of the present application with different expressions is applicable if they are technically equivalent, without intention of limiting the scope of rights. Moreover, each embodiment can appropriately be combined within a range of not causing any contradiction in processing contents.

Also, as to the terms used in the present description and the technical contents described therein, terms and technical contents described in the specifications of 3GPP etc. as communication-related standards may appropriately be used.

First Embodiment

<Configuration Example of Radio Communication System>

Figure 1:
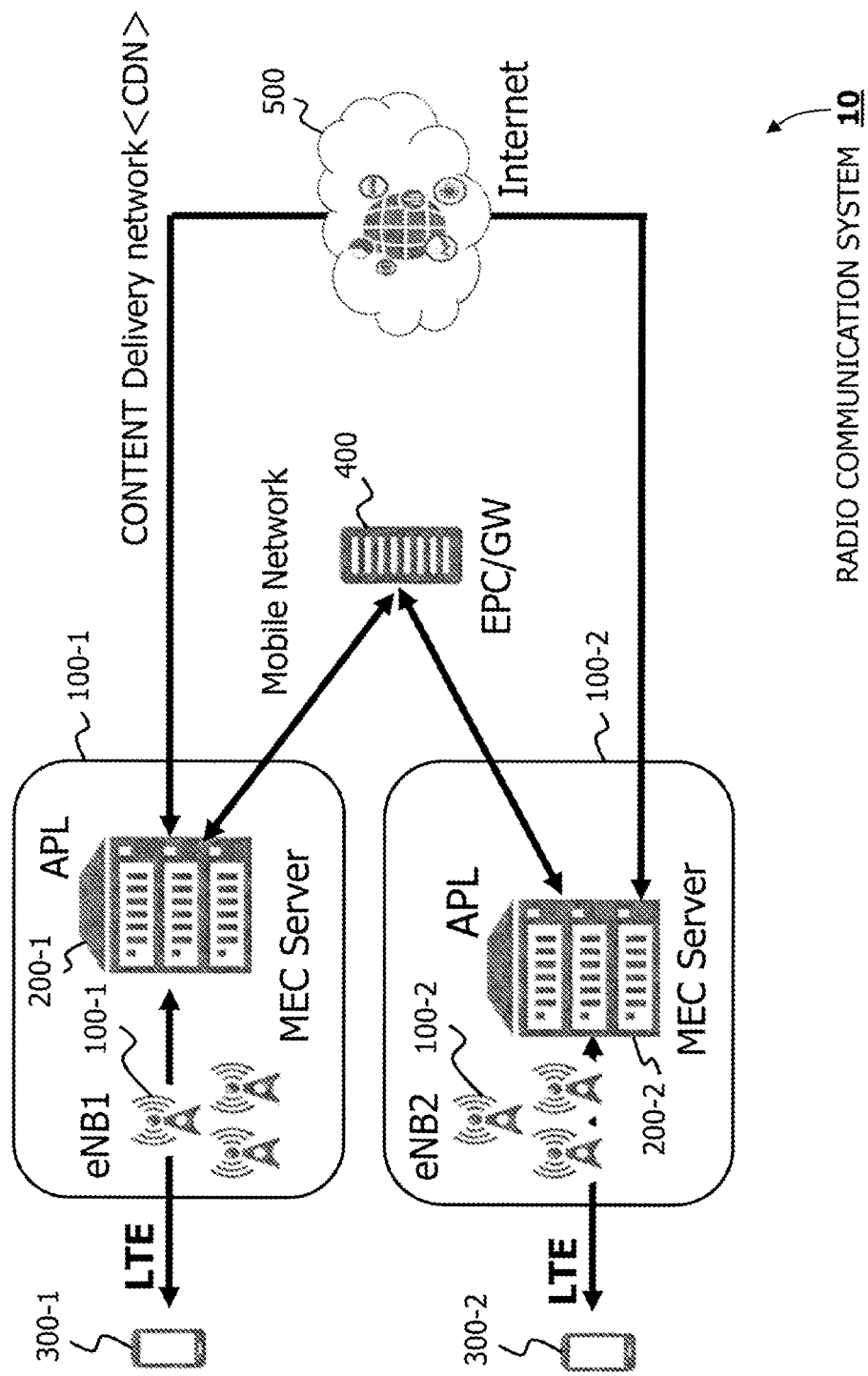
FIG. 1 is a diagram illustrating a configuration example of a radio communication system.

FIG. 1 illustrates a configuration example of a radio communication system in a first embodiment.

A radio communication system 10 includes eNB (Evolved Nodes B) 100-1, 100-2, MEC (Mobile-Edge Computing) servers 200-1, 200-2, terminal apparatuses (or UE (User Equipment): which may hereinafter be referred to as "terminal") 300-1, 300-2 and an EPC/GW 400.

The eNB 100-1, 100-2 are, for example, base station apparatuses or radio communication apparatuses which perform radio communication with the terminals 300-1, 300-2 each located in a range (or a cell range) in which each own base station can provide a service, to provide a variety of services including a speech communication service and a Web browsing service. Hereinafter, the eNB may be referred to as a base station, for example.

The MEC servers 200-1, 200-1 are, for example, application servers (or application server apparatuses) which actualize mobile-edge computing. Hereinafter, each MEC server may be referred to as an application server, for example. The application servers 200-1, 200-1 provide a variety of services, including a Web browsing service, a video distribution service, or the like, to the terminals 300-1, 300-2 via the base stations 100-1, 100-2.

Additionally, in the example of FIG. 1, there is depicted an example in which the application servers 200-1, 200-2 are located in the vicinity of the base stations 100-1, 100-2, respectively, so as to be connected to the base stations 100-1, 100-2, respectively. Here, the application servers 200-1, 200-2 may be located (or combined) in the base stations 100-1, 100-2, for example. Also, the application servers 200-1, 200-2 may be located in an EPC (Evolved Packet Core) network, for example. In this case, for example, the application servers 200-1, 200-2 may be located in an S-GW (Switching Gateway) or a P-GW (PDN (Packet Data Network) Gateway) in the EPC network, or may be located in the vicinity of these gateway apparatuses and connected thereto. Such a connection mode as described above may be referred to as "application servers connected to the base stations", integrally as a whole, for example.

The application server 200-1 and the application server 200-2 are connected by a CDN (Content Delivery Network) via the Internet 500, and also connected by a mobile network via the EPC/GW 400. The two application servers 200-1, 200-2 can exchange a message, or the like, using the CDN or the mobile network.

Each terminal 300-1, 300-2 is a radio communication apparatus including a feature phone, a smartphone, a personal computer, a tablet terminal, a game apparatus, and so on. In the example of FIG. 1, there is depicted an example in which the terminal 300-1 is connected to the base station 100-1 to receive service provision from the application server 200-1, and the terminal 300-2 is connected to the base station 100-2 to receive service provision from the application server 200-2.

The EPC/GW 400 represents a gateway apparatus or the like, connected to the EPC network, for example. As examples of such an apparatus, there are the aforementioned S-GW, the P-GW, an MME (Mobility Management Entity), or the like.

<Example of Handover>

Figure 2:
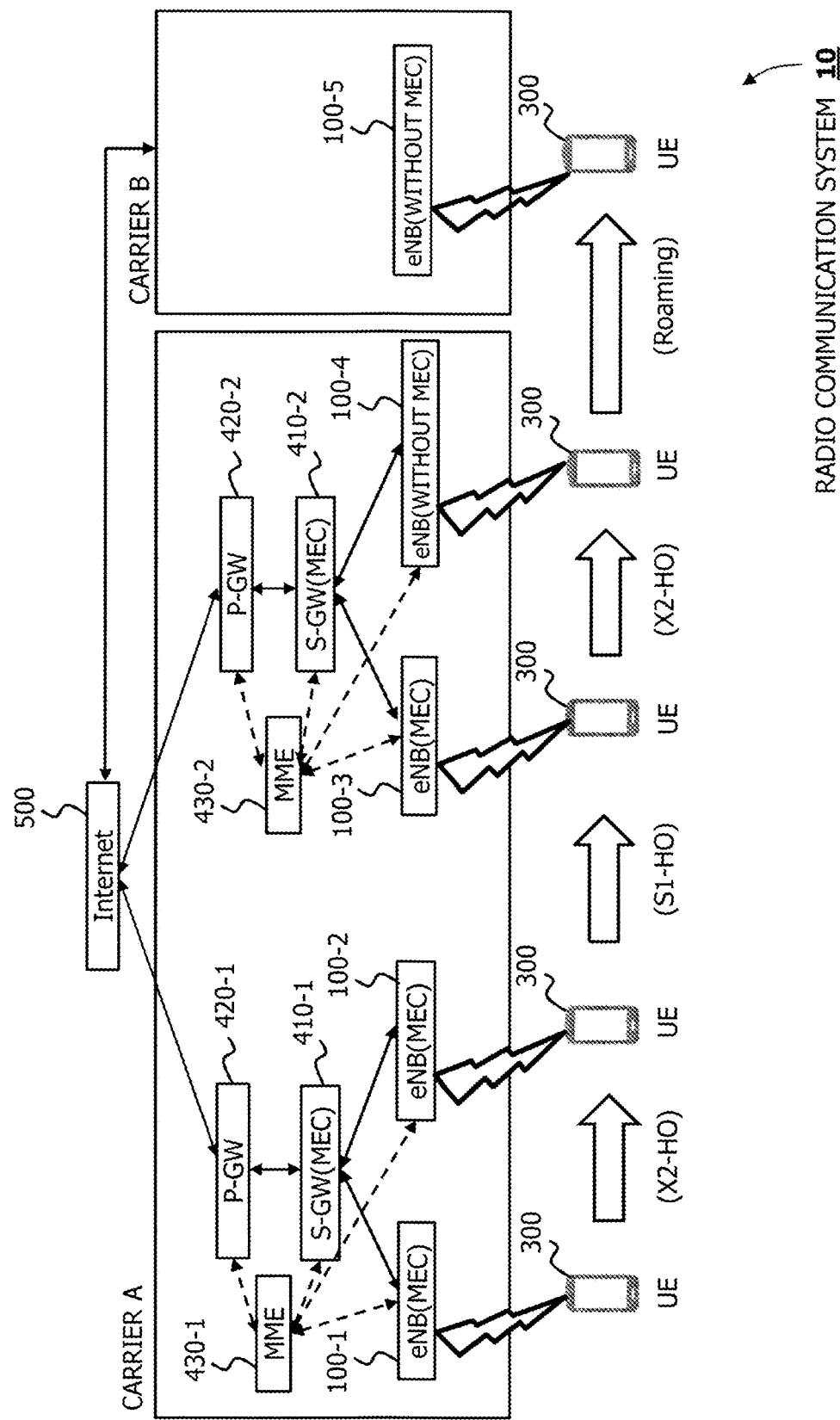
FIG. 2 is a diagram illustrating a configuration example of a radio communication system including an example of a handover.

FIG. 2 illustrates an example of a handover in the radio communication system 10. In the example of the radio communication system 10 depicted in FIG. 2, there are included S-GW 410-1, 410-2, P-GW 420-1, 420-2 and MME 430-1, 430-2, as the EPC/GW 400.

On the terminal 300, when a handover from the base station 100-1 to the base station 100-2 is performed, it is configured to perform the handover between the base stations 100-1 and 100-2 which are subordinate to the same MME 430-1, for example. In this case, each base station 100-1, 100-2 exchanges a handover-related message (or control information) with the other base station 100-2, 100-2, using an X2 interface. The handover in this case comes to an X2 handover (X2-HO).

On the other hand, at the execution of a handover of the terminal 300 from the base station 100-2 to a base station 100-3, it is configured that the handover is carried out from the base station 100-2 which is subordinate to the MME 430-1 to the base station 100-3 which is subordinate to the MME 430-2. In this case, the base stations 100-2, 100-3 exchange a handover-related message via the MME 430-1, 430-2 using an S1 interface. The handover in this case comes to an S1 handover.

In the present first embodiment, at the handover, control information related to an application server 200 is transmitted from a handover destination base station (which may hereafter be referred to as a "target base station") to a handover source base station (which may hereafter be referred to as a "source base station").

For example, when the terminal 300 is to be handed over from the base station 100-1 to the base station 100-2, the target base station 100-2 transmits control information related to an application server 200 located in the own base station and related to an application server 200 located in the S-GW 410-1.

Also, for example, when the terminal 300 is to be handed over from the base station 100-2 to the base station 100-3, the target base station 100-3 transmits control information related to an application server 200-3 located in the own base station and related to an application server located in the S-GW 410-2.

Further, for example, when the terminal 300 is to be handed over from the base station 100-3 to a base station 100-4, the target base station 100-4 transmits control information related to the application server located in the S-GW 410-2.

As to the control information related to the application server, for example, there are connection information (or location information) and information related to a route of the application server 200, information related to the transmission capability (or a transmission delay) of the application server 200, information related to a service that can be provided (or can be handled), and so on. Additionally, in the following, the control information related to application server may be referred to as Network capability information, for example. The details will be described later.

The source base station 100-1, having received network capability information at the handover, becomes able to select an application server 200 according to the received network capability information, for example. The details will be described later.

In the following, each base station 100-1, 100-2 may be referred to as a base station 100, and each application server 200-1, 200-2 may be referred to as an application server 200, and each terminal 300-1, 300-2 may be referred to as a terminal 300.

<Configuration Example of the Base Station>

Figure 3:
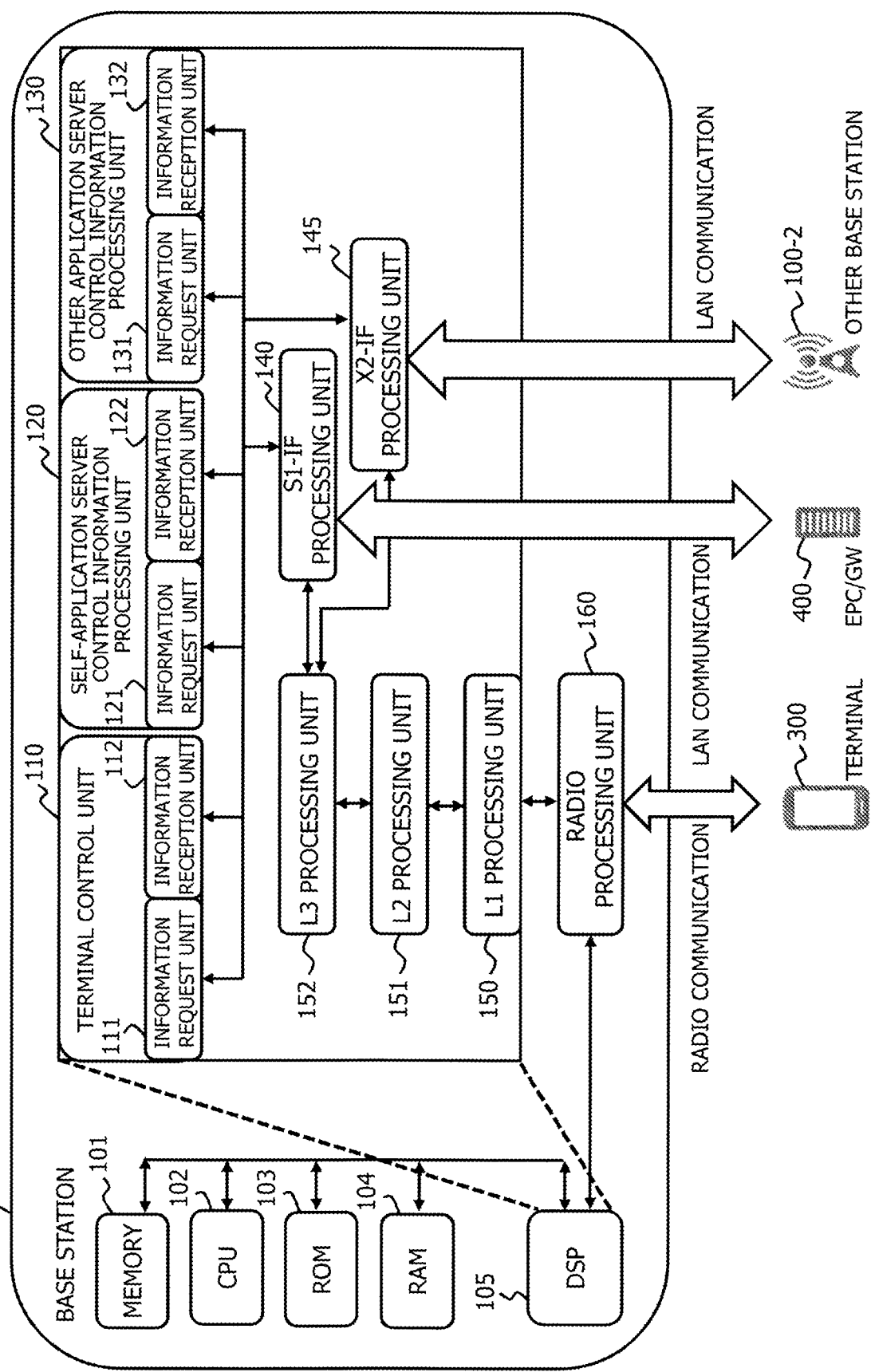
FIG. 3 is a diagram illustrating a configuration example of a radio base station.

FIG. 3 is a diagram illustrating a configuration example of the base station 100. Here, the base station 100 depicted in FIG. 3 represents a configuration example when an application server is connected to in the vicinity of the base station 100.

The base station 100 includes a memory 101, a CPU (Central Processing Unit) 102, a ROM (Read Only Memory) 103, a RAM (Random Access Memory) 104, a DSP (Digital Signal Processing) 105 and a radio processing unit 160.

The memory 101 stores a variety of information including network capability information and data, for example. When processing is performed in the CPU 102 and the DSP 105, various information and data are appropriately stored or read out to and from the memory 101 by the CPU 102 and the DSP 105.

For example, the CPU 102 loads a program stored in the ROM 103 into the RAM 104, and executes the loaded program to thereby execute various processing and functions in the base station 100.

The DSP 105 reads out a program stored in the ROM 103, for example, and executes the program to thereby execute each function of a terminal control unit 110, an own application server control information processing unit (which may hereafter be referred to as "own server control information processing unit") 120 and an other application server control information processing unit (which may hereafter be referred to as "other server control information processing unit") 130. Further, the DSP 105 executes the program to thereby execute each function of an S1-IF (Interface) processing unit 140, an X2-IF processing unit 145, an L1 (Layer 1) processing unit 150, an L2 (Layer 2) processing unit 151 and an L3 (Layer 3) processing unit 152.

The DSP 105 corresponds to, for example, the terminal control unit 110, the own server control information processing unit 120 and the other server control information processing unit 130, the S1-IF processing unit 140, the X2-IF processing unit 145, the L1 processing unit 150, the L2 processing unit 151 and the L3 processing unit 152.

The terminal control unit 110 controls the terminal 300, for example. The terminal control unit 110 exchanges user data (or individual data), a handover-related message, or the like, with the terminal 300 via the S1-IF processing unit 140, for example. Also, the terminal control unit 110 exchanges user data, or the like, with the EPC/GW 400 or the other base station 100-2 via the S1-IF processing unit 140 or the X2-IF processing unit 145, respectively. The terminal control unit 110 includes an information request unit 111 and an information reception unit 112.

The information request unit 111 transmits user data, a message, or the like, to the terminal 300, the EPC/GW 400, or the other base station 100-2, via the S1-IF processing unit 140 or the X2-IF processing unit 145, for example.

The information reception unit 112 receives user data, a message, or the like, transmitted from the terminal 300, the EPC/GW 400, or the other base station 100-2, via the S1-IF processing unit 140 or the X2-IF processing unit 145, for example. Also, the information reception unit 112, for example, receives a handover-related message (or control information) transmitted from the other base station 100-2 or the EPC/GW 400. The information reception unit 112 may be a control information reception unit, for example.

The own server control information processing unit 120, for example, processes control information related to the application server 200 connected to the own base station 100. For example, the own server control information processing unit 120 generates network capability information, generates a handover-related message, or the like. The own server control information processing unit 120 includes an information request unit 121 and an information reception unit 122.

The information request unit 121 transmits network capability information, the handover-related message, or the like, via the X2-IF processing unit 145 to the source base station 100-1, for example. Also, the information request unit 121 transmits network capability information, the handover-related message, or the like, via the S1-IF processing unit 140 to the EPC/GW 400, for example.

The information reception unit 122 receives a transmission request for network capability information (which may hereafter be referred to as a "network capability request"), the handover-related message, or the like, from the source base station 100-1 via the X2-IF processing unit 145, for example. Also, the information reception unit 122 receives a network capability request, the handover-related message, or the like, from the EPC/GW 400 via the S1-IF processing unit 140, for example.

The other server control information processing unit 130 processes control information related to the application server 200 which is connected to the other base station, for example. The other server control information processing unit 130 generates network capability information, generates the handover-related message, or the like, for example.

An information request unit 131 transmits the network capability request, the handover-related message, or the like, via the X2-IF processing unit 145 to the target base station 100-2, for example. Also, the information request unit 131 transmits the network capability request, the handover-related message, or the like, to the EPC/GW 400, via the S1-IF processing unit 140, for example.

An information reception unit 132 receives the network capability information, the handover-related message, or the like, from the target base station 100-2 via the X2-IF processing unit 145, for example. Also, the information reception unit 132 receives network capability information, handover-related message, or the like, from the EPC/GW 400 via the S1-IF processing unit 140, for example. The information reception unit 132, because it receives the message (or control information), may be a control information reception unit.

The S1-IF processing unit 140 exchanges packet data related to the S1 interface with the EPC/GW 400. Specifically, for example, the S1-IF processing unit 140 receives user data, message, or the like, which is output from the terminal control unit 110, the own server control information processing unit 120, or the other server control information processing unit 130, converts into S1-interface packet data, and transmits to the EPC/GW 400. Also, for example, the S1-IF processing unit 140 extracts user data, message, or the like, from packet data received from the EPC/GW 400, so as to output to the terminal control unit 110, the own server control information processing unit 120, or the other server control information processing unit 130.

The X2-IF processing unit 145 exchanges packet data related to the X2 interface with the other base station 100-2. Specifically, for example, the X2-IF processing unit 145 receives user data, message, or the like, output from the terminal control unit 110, the own server control information processing unit 120, or the other server control information processing unit 130, converts into X2 interface packet data, and transmits to the other base station 100-2. Also, for example, the X2-IF processing unit 145 extracts user data, message, or the like, from packet data received from the other base station 100-2, and outputs to the terminal control unit 110, the own server control information processing unit 120, or the other server control information processing unit 130.

The L1 processing unit 150, for example, performs processing which is related to the layer 1, including modulation processing, coding processing, or the like. Specifically, for example, the L1 processing unit 150 receives a baseband signal from the radio processing unit 160, performs demodulation processing or the like on the received baseband signal, and generates a MAC (Media Access Control) packet. The L1 processing unit 150 outputs the MAC packet to the L2 processing unit 151. Also, for example, the L1 processing unit 150 receives a MAC packet from the L2 processing unit 151, performs modulation processing or the like, on data or the like, included in the received MAC packet, and converts into a baseband signal. The L1 processing unit 150 outputs the baseband signal to the radio processing unit 160.

The L2 processing unit 151, for example, performs processing which is related to the layer 2, including radio resource allocation and retransmission control. Specifically, for example, the L2 processing unit 151 extracts an IP (Internet Protocol) packet from a MAC packet which is received from the L1 processing unit 150, and then outputs the extracted IP packet to the L3 processing unit 152. Also, for example, the L2 processing unit 151 adds a MAC header or the like to an IP packet received from the L3 processing unit 152 to generate a MAC packet, and outputs the generated MAC packet to the L2 processing unit 151.

The L3 processing unit 152, for example, performs processing which is related to the layer 3, including broadcast information distribution processing, RRC (Radio Resource Control) connection, or the like. Specifically, for example, the L3 processing unit 152 outputs an IP packet, received from the L2 processing unit 151, via the S1-IF processing unit 140 to the terminal control unit 110. Also, for example, the L3 processing unit 152 outputs to the L2 processing unit 151 an IP packet which is received from the terminal control unit 110 via the S1-IF processing unit 140.

The radio processing unit 160, for example, performs frequency conversion processing or the like on a baseband signal output from the L1 processing unit 150, converts into a radio signal of a radio band, and outputs to the terminal 300. Also, the radio processing unit 160 receives a radio signal output from the terminal 300, and performs frequency conversion processing or the like on the received radio signal, converts into a baseband signal in a baseband, and outputs the converted baseband signal to the L1 processing unit 150.

<Configuration Example of the Application Server>

Figure 4:
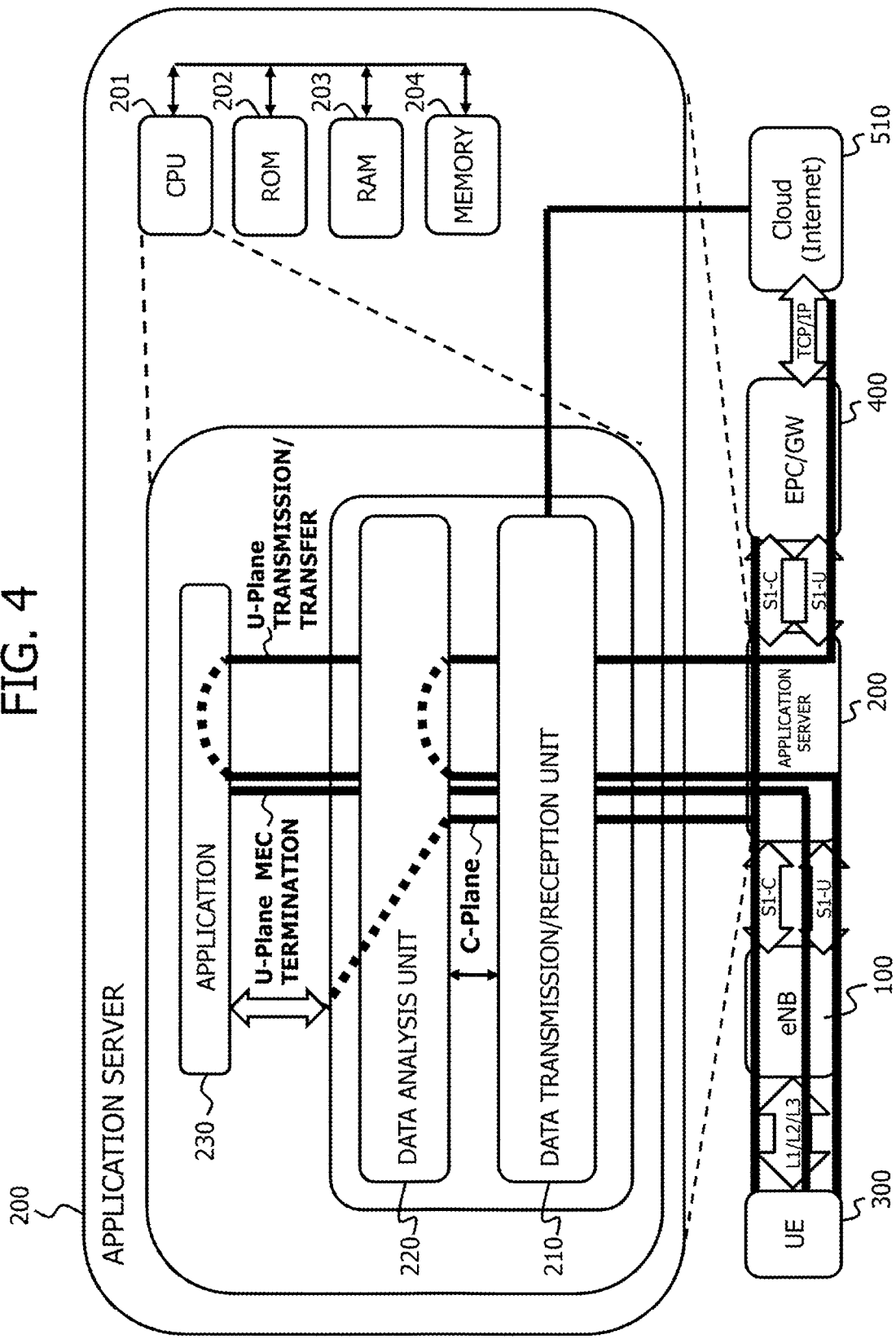
FIG. 4 is a diagram illustrating a configuration example of an application server.

FIG. 4 is a diagram illustrating a configuration example of the application server 200. The application server 200 includes a CPU 201, a ROM 202, a RAM 203 and a memory 204. The CPU 201 reads out a program stored in the ROM 202 to load into the RAM 203 and executes the loaded program, so that can execute each function of a data transmission and reception unit 210, a data analysis unit 220 and an application unit 230. The CPU 201 corresponds to the data transmission and reception unit 210, the data analysis unit 220 and the application unit 230.

The data transmission and reception unit 210, for example, performs the transmission or reception of data, control information, or the like, between with the base station 100 and the EPC/GW 400. For example, the data transmission and reception unit 210 may transmit and receive the data, the control information, or the like, using the S1 interface (or S1-U (User Plane)).

The data analysis unit 220, for example, analyzes control information and exchanges (or relays) user data with the data transmission and reception unit 210 and the application unit 230. For example, based on the control information, the data analysis unit 220 can instruct the application unit 230 to provide or stop a service.

The application unit 230 provides a service to the terminal 300 or stop to provide the service according to an instruction from the data analysis unit 220, for example. The application unit 230, for example, reads out a content stored in the memory 204 to transmit to the terminal 300 to thereby provide a video distribution service.

Additionally, the data transmission and reception unit 210 or the data analysis unit 220 may be, for example, a communication unit (or communicator) which transmits and receives user data (or individual data) between with the terminal 300 via the base station 100. Also, for example, the data transmission and reception unit 210 or the data analysis unit 220 may be a server channel control unit (or controller) which transmits application state information to the application server 200-2, which is connected to the target base station 100-2, and the application server 200-2 which is connected to the source base station 100-1.

<Configuration Example of the Terminal>

Figure 5:
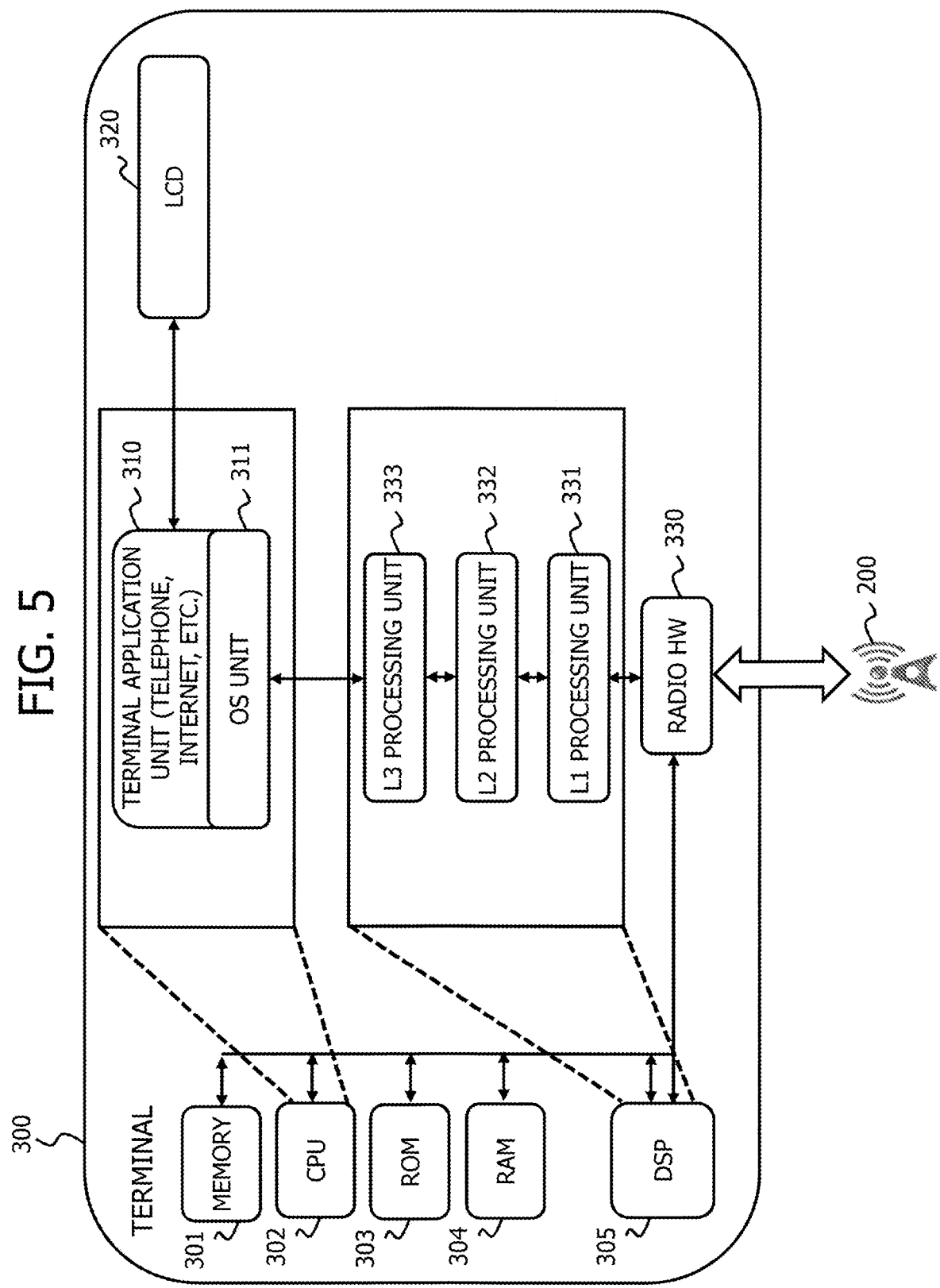
FIG. 5 is a diagram illustrating a configuration example of a terminal.

FIG. 5 is a diagram illustrating a configuration example of the terminal 300. The terminal 300 includes a memory 301, a CPU 302, a ROM 303, a RAM 304, a DSP 305, an LCD (Liquid Crystal Display) 320 and a radio HW (Hardware) 330.

The memory 301 stores user data, control information, or the like, for example.

The CPU 302 reads out a program stored in the ROM 303 to load into the RAM 304 and execute the loaded program, to thereby execute the function of a terminal application unit 310. The CPU 302 corresponds to the terminal application unit 310, for example.

The terminal application unit 310 executes a variety of applications including telephone, Web browsing, or the like, via an OS (Operating System) unit 311.

The LCD 320 receives user data or the like from the terminal application unit 310 to cause to video display the data concerned, for example. Also, triggered by a user operation, for example, the LCD 320 generates control information corresponding to the operation to output to the terminal application unit 310. Such control information includes a content distribution request or the like, for example.

The DSP 305 executes a program stored in the ROM 303 by an instruction from the CPU 302, to execute each function of an L1 processing unit 331, an L2 processing unit 332 and an L3 processing unit 333. The DSP 305 corresponds to the L1 processing unit 331, the L2 processing unit 332 and the L3 processing unit 333, for example.

The radio HW 330, for example, performs processing for a radio signal. For example, the radio HW 330 receives a baseband signal from the L1 processing unit 331, performs frequency conversion processing or the like on the baseband signal to convert into a radio signal, and outputs the converted radio signal to the base station 100. Also, for example, the radio HW 330 receives a radio signal transmitted from the base station 100, performs frequency conversion processing or the like on the received radio signal to convert into a baseband signal, and outputs the converted baseband signal to the L1 processing unit 331. The radio HW 330 may be a reception unit (or a receiver) which receives control information, user data, or the like, transmitted from the base station 100, for example.

The L1 processing unit 331, for example, performs processing which is related to the layer 1, including modulation processing, coding processing, or the like. Specifically, for example, the L1 processing unit 331 performs demodulation processing or the like on a baseband signal received from the radio HW 330, generate a MAC packet, and outputs the generated MAC packet to the L2 processing unit 332. Also, for example, the L1 processing unit 331 performs modulation processing or the like on data or the like included in a MAC packet received from the L2 processing unit 332, converts into a baseband signal, and outputs the converted baseband signal to the radio HW 330.

The L2 processing unit 332, for example, performs processing which is related to the layer 2, including retransmission control or the like. Specifically, for example, the L2 processing unit 332 receives a MAC packet from the L1 processing unit 331, extracts an IP packet from the MAC packet, and outputs the extracted IP packet to the L3 processing unit 333. Also, for example, the L2 processing unit 332 receives an IP packet from the L3 processing unit 333 to add a MAC header or the like, generates a MAC packet from the IP packet, and outputs the generated MAC packet to the L1 processing unit 331.

The L3 processing unit 333, for example, performs processing which is related to the layer 3, including broadcast information distribution processing, RRC (Radio Resource Control) connection, or the like. Specifically, for example, the L3 processing unit 333 outputs an IP packet received from the L2 processing unit 332 to the terminal application unit 310. Also, for example, the L3 processing unit 333 outputs an IP packet received from the terminal application unit 310 to the L2 processing unit 332.

<Operation Example>

Next, an operation example will be described. First, a brief description will be given of an operation example 1 and an operation example 2.

<1. Operation Example 1>

Figure 6:
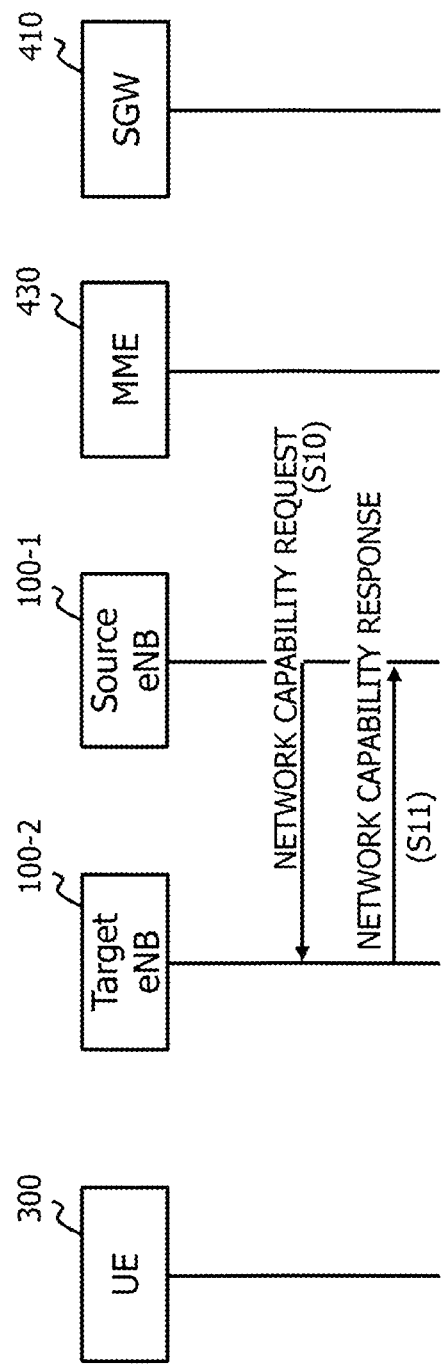
FIG. 6 is a sequence diagram illustrating an example of transmission operation of network capability information.

FIG. 6 is a sequence diagram illustrating an example of the operation example 1. In the present first embodiment, the source base station 100-1 transmits a Network capability request to the target base station 100-2 (S10). The target base station 100-2, on receiving this request, transmits a network capability response to the source base station 100-1.

Using the network capability request, the source base station 100-1 requests the target base station 100-2 to transmit network capability information of the application server 200-2 which is connected to the target base station 100-2. Then, the target base station 100-2 transmits the network capability information to the source base station 100-1 using the network capability response. The details of the operation example 1 will be described later.

<2. Operation Example 2>

Figure 7:
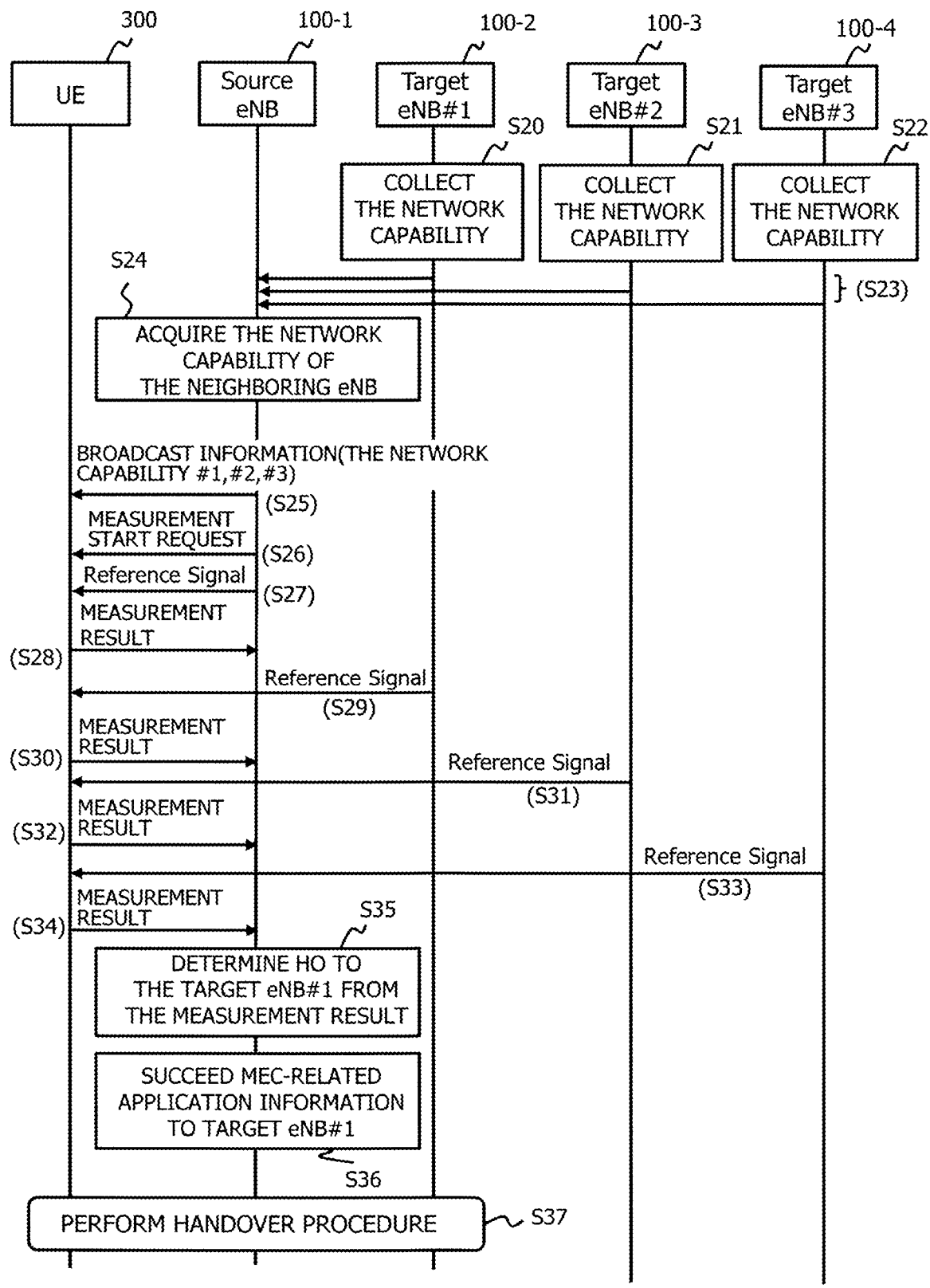
FIG. 7 is a sequence diagram illustrating an example of information collection operation.

FIG. 7 is a sequence diagram illustrating an example of the operation example 2. The present operation example 2 is an example of information collection operation.

As depicted in FIG. 7, the target base stations 100-2 to 100-4 collect network capability information of each application server 200 connected to each own base station (S20-S22).

Figure 13:
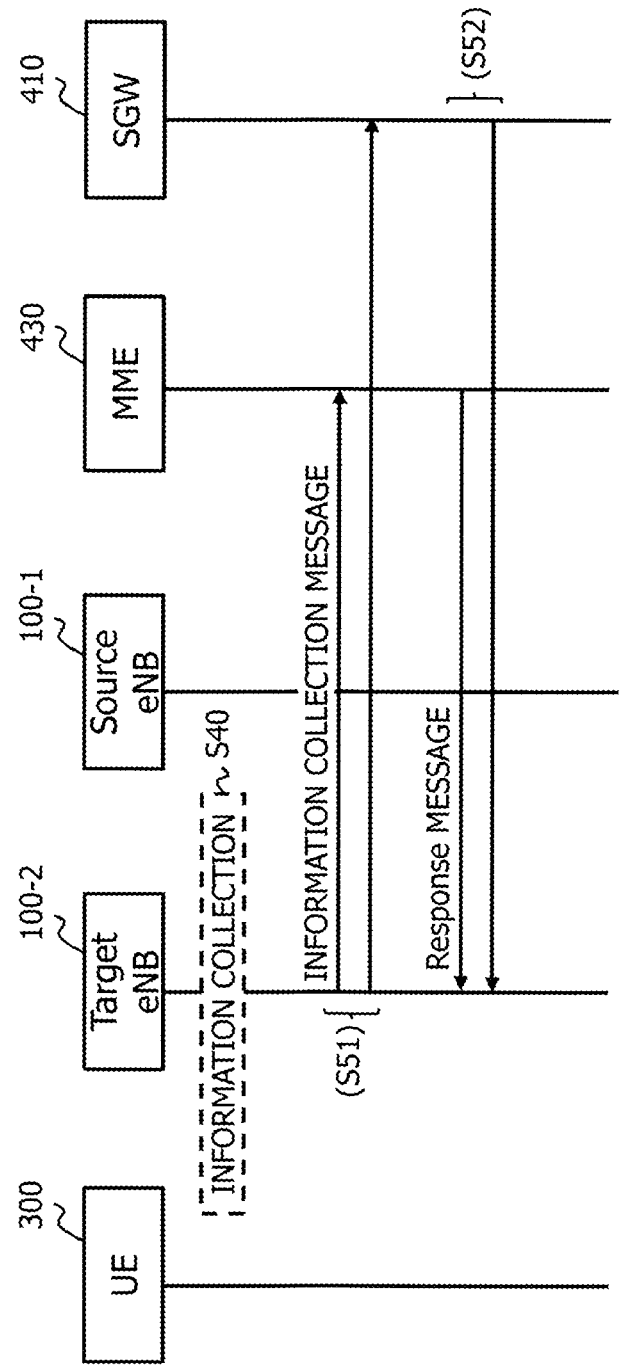
FIG. 13 is a sequence diagram illustrating an example of information collection operation.

FIG. 13 illustrates an operation example of collecting the network capability information. The target base station 100-2 transmits an information collection message to the EPC/GW 400 (MME 430 and S-GW 410 in FIG. 13), and then receives a response message from the EPC/GW 400 (S52).

In the target base station 100-2, the following processing is performed, for example. Namely, the own server control information processing unit 120 generates an information collection message to transmit via the S1-IF processing unit 140, or the like, to the EPC/GW 400 which is connected to the own base station. The own server control information processing unit 120 receives a response message from the EPC/GW 400 via the S1-IF processing unit 140, or the like, to extract network capability information from the response message, so that the own server control information processing unit 120 stores the extracted network capability information into the memory 101.

Additionally, the own server control information processing unit 120 transmits or receives each message via the information request unit 121 or the information reception unit 122. Also, for example, the own server control information processing unit 120 may be a control information collection unit (or controller) which collects control information including the network capability information, or the like.

Further, when the application server 200-2 is combined with the target base station 100-2, the own server control information processing unit 120 reads out the network capability information of the application server 200-2 which is stored in the memory 101, using API (Application Programming Interface) or the like. This enables the target base station 100-2 to acquire the network capability information of the application server 200-2 which is combined with the own base station.

Referring back to FIG. 7, each target base station 100-2 to 100-4 transmits the collected network capability information to the source base station 100-1 which is a handover source base station (S23). For example, the own server control information processing unit 120 of the target base station 100-2 to 100-4 transmits the collected network capability information to the source base station 100-1 via the X2-IF processing unit 145.

The source base station 100-1 receives the network capability information transmitted from the target base station 100-2 to 100-4 to acquire the network capability information of the neighboring target base station 100-2 to 100-4 (S24). For example, the other server control information processing unit 130 of the source base station 100-1 receives the network capability information via the S1-IF processing unit 140, so as to store the received network capability information into the memory 101. This enables, for example, the source base station 100-1 to collect in advance the network capability information of the target base station 100-2 to 100-4 before the start of a handover. The other server control information processing unit 130 in the source base station 100-1 may also be possible to become a control information collection unit (or a controller), for example.

The source base station 100-1 transmits toward the terminal 300 the broadcast information including the collected network capability information (S25).

The source base station 100-1 performs the following processing, for example. Namely, the own server control information processing unit 120 outputs the collected network capability information to the terminal control unit 110. The terminal control unit 110 generates the broadcast information including the network capability information to transmit to the terminal 300.

Thereafter, a handover procedure is executed. Namely, the source base station 100-1 transmits a measurement start request to the terminal 300 (S26), so that the terminal 300 measures received power or the like, according to a reference signal transmitted from each base station 100-1 to 100-4 (S27, S29, S31, S33) to transmit each measurement result to the source base station 100-1 (S28, S30, S32, S34). Based on the measurement result, the source base station 100-1 decides a target base station 100-2 to be a handover destination (S35), and transmits application state information to the target base station 100-2 (S36).

The application state information is, for example, information related to the continuation or the state of a service provided from the application server 200. As an example of such information, for example, there is a time of the service which is provided by the application server 200 to the terminal 300. The details of the application state information will be described later.

Then, the terminal 300 thereafter performs a handover procedure (S37).

The above-mentioned example has been described of an example when the information collection operation is performed before the start of the handover. Such information collection operation (S20-S24) may be performed minimally once before the start of handover. Alternatively, the information collection operation (S20-S24) may be performed at a constant period.

Figure 15:
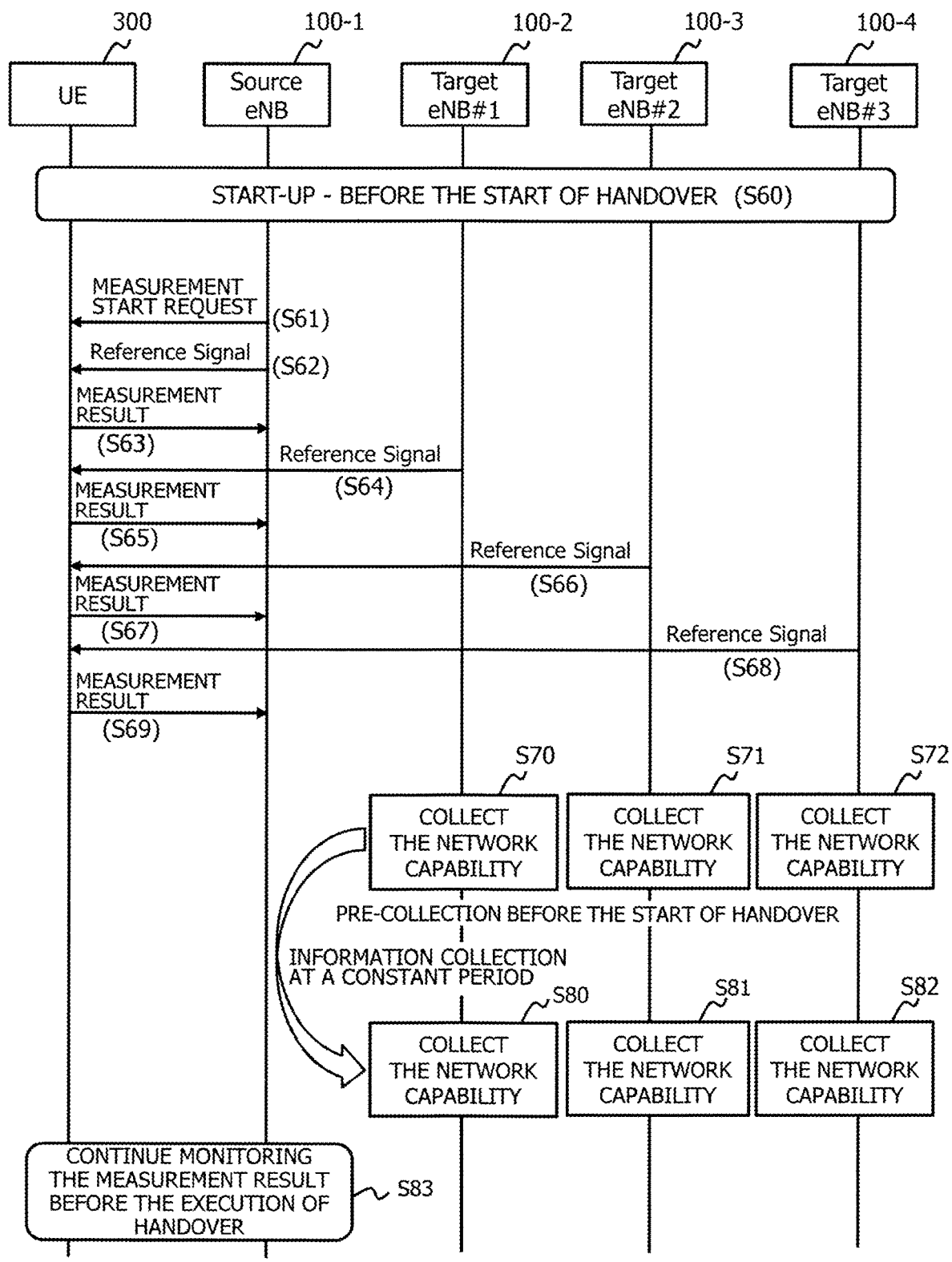
FIG. 15 is a sequence diagram illustrating an example of information collection operation.

FIG. 15 illustrates, as an example of the information collection operation, a sequence example in the case of being performed after the transmission of each reference signal.

Similar to the example of FIG. 7, the source base station 100-1 transmits a measurement start request to the terminal 300 (S61), and thereafter, the terminal 300 receives the reference signal from each base station 100-1 to 100-4 (S62, S64, S66, S68). Then, the terminal 300 transmits each measurement result to the base station 100-1 (S63, S65, S67, S69).

Thereafter, each target base station 100-2 to 100-4 collects the network capability information of the application server 200 which is connected to the own base station (S70-S72). Similar to the example of FIG. 7, the target base station 100-2 to 100-4 may perform the collection by using the S1 interface, the API, or the like.

In the example of FIG. 15, each target base station 100-2 to 100-4 performs the collection of network capability information after the constant period (S80-S82). Performing the collection in the target base station 100-2 to 100-4 at a constant period enables the collection of the most up-to-date network capability information, for example. Each target base station 100-2 to 100-4 then transmits the collected network capability information to the source base station 100-1. The own server control information processing unit 120 of the source base station 100-1 comes to, for example, a control information collection unit (or a controller) which collects control information periodically.

In this case, each target base station 100-2 to 100-4 may collect the network capability information by the transmission of an information collection message (S51) and the reception of a response message (S52), as depicted in FIG. 13, for example.

Referring back to FIG. 15, after collecting the network capability information, the terminal 300 continuously transmits each measurement result to the source base station 100-1 (S83).

<1.1 Regarding Concrete Example of the Operation Example 1>

Next, a concrete example of the operation example 1 will be described. Here, it is described how network capability information and a request therefor (which may hereafter be referred to as a "network capability request") are passed over from the target base station 100-2 to the source base station 100-1. There are two examples as follows.

As a first example, there is an example in which the network capability information and the request therefor are added to a message which is defined as an HO procedure in the 3GPP etc.

Figure 8A:
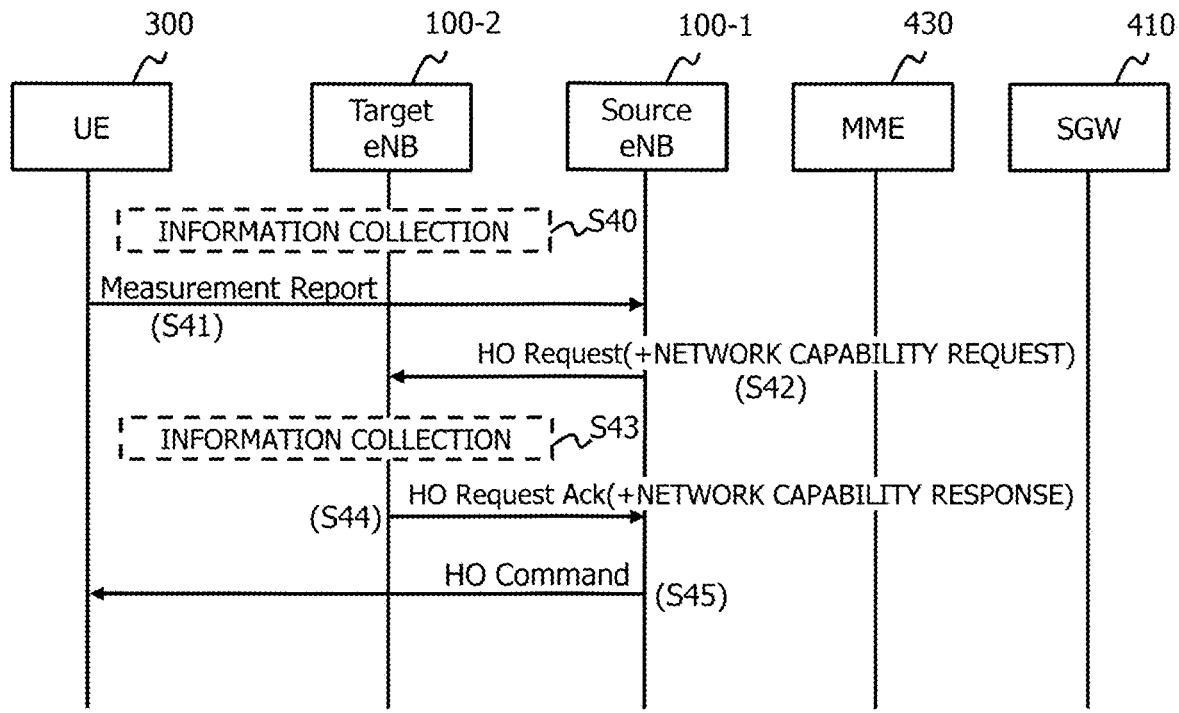
FIGS. 8A and 8B are sequence diagrams illustrating operation examples.
Figure 8B:
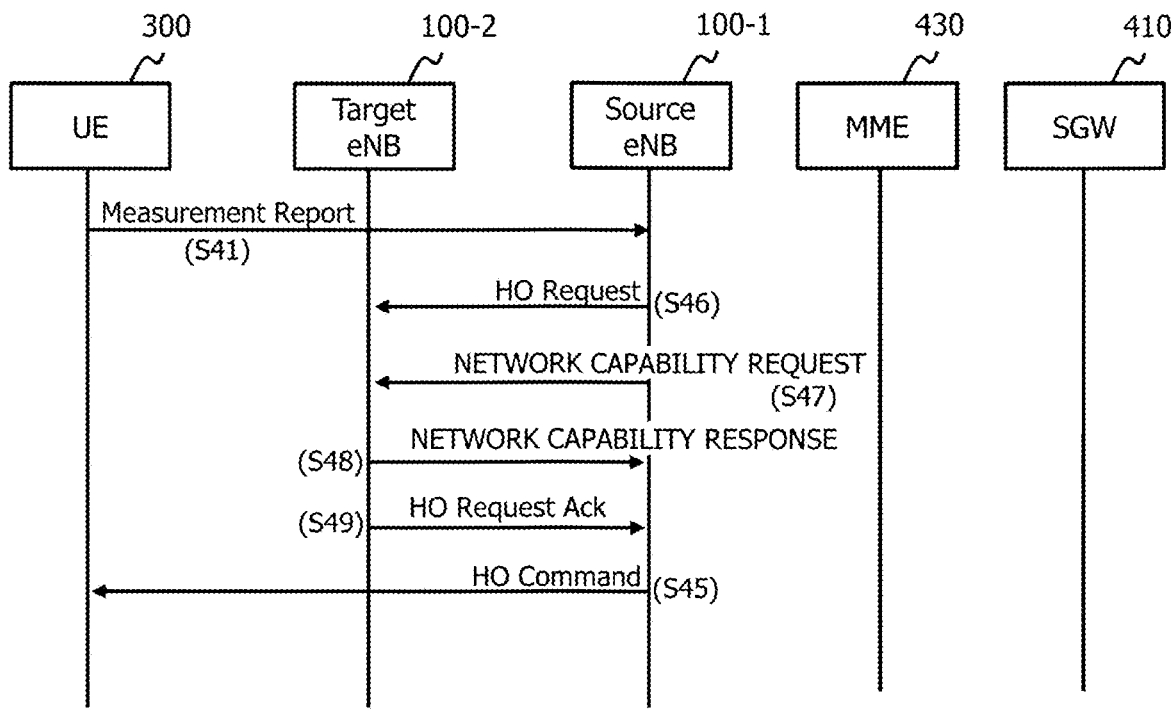

FIG. 8 (A) is a diagram illustrating a sequence example in such a case. The terminal 300 transmits a Measurement Report to the source base station 100-1 (S41).

Next, the source base station 100-1 transmits to the target base station 100-2 an HO (Handover) Request which includes a request for network capability information (which may hereafter be referred to as "network capability request") (S42).

Next, the target base station 100-2 transmits to the source base station 100-1 an HO Request Ack (Acknowledgment)

which includes network capability information related to the application server which is connected to the own base station (S44).

Next, the source base station 100-1 transmits an HO Command to the terminal 300 (S45). In this case, the source base station 100-1 may decide an application server 200 connected to the target base station 100-2 to be a takeover destination of the application server 200, according to the network capability information. The HO Command includes the information of the target base station 100-2 or the like, for example. By the reception of the HO Command, the terminal 300 receives control information to connect to the target base station 100-2.

Here, as to the network capability information related to the application server 200 connected to the own base station, the target base station 100-2 may collect in advance before a handover sequence is performed (S40), or may collect on receipt of the HO Request (S43).

For example, the target base station 100-2 may perform processing as depicted in FIG. 13 to acquire the network capability information. Namely, the target base station 100-2 transmits to the MME 430 and the S-GW 410 each information collection message (S51), and then receives each response message thereto from the MME 430 and the S-GW 410 (S52).

When the application server 200 is located (combined) in the target base station 100-2, the network capability information may be passed over using API in the target base station 100-2.

As a second example, there is an example in which network capability information and a network capability request are added as a new sequence at the handover.

FIG. 8 (B) is a diagram illustrating a sequence example in such a case. In this case, the source base station 100-1 transmits to the target base station 100-2 an HO Request (S46), which is followed by a new message (or a new procedure; which may hereafter be referred to as "new procedure") which indicates a request for network capability information (S47).

On receiving the message, the target base station 100-2 transmits a response message (new procedure) including network capability information to the source base station 100-1 (S48).

Thereafter, the target base station 100-2 transmits an HO Request Ack to the source base station 100-1 (S49), so that the source base station 100-1 transmits an HO Command to the terminal 300 (S45).

In the example of FIG. 8 (B), the network capability request (S47) and the network capability response (S48) are transmitted during between the HO Request (S46) and the HO Request Ack (S49). Here, the transmission may be performed during before the completion of the handover.

In both of the first and second examples, when a base station 100 is the source base station 100-1 and the handover is performed at the terminal 300, the operation is as follows, for example.

Namely, the control information (Measurement Report etc.) (or a message) or the like transmitted from the terminal 300 is transmitted to the terminal control unit 110 via the radio processing unit 160 or the like. The terminal control unit 110, on receiving such control information, instructs the own server control information processing unit 120 or the other server control information processing unit 130 to transmit handover-related control information. In this case, the terminal control unit 110 may instruct the other server control information processing unit 130 to transmit the network capability request, whereas for other control information, may instruct the own server control information processing unit 120. According to each instruction, the own server control information processing unit 120 and the other server control information processing unit 130 generate the handover-related control information, or the like, to transmit to the target base station 100-2 or the EPC/GW 400 via the X2-IF processing unit 145 or the S1-IF processing unit 140, respectively. In this case, the other server control information processing unit 130 may generate and transmit an HO Request including a network capability request, or may generate and transmit a network capability request as a new procedure.

Meanwhile, the control information, or the like, transmitted from the other base station 100-2 or the EPC/GW 400 is transmitted to the own server control information processing unit 120 or the other server control information processing unit 130 via the X2-IF processing unit 145 or the S1-IF processing unit 140, respectively. In this case, network capability information (which may be included in the HO Request Ack or may be a new procedure) may be received in the other server control information processing unit 130, whereas other handover-related control information, or the like, may be received in the own server control information processing unit 120. The own server control information processing unit 120 and the other server control information processing unit 130 output the received control information, or the like, to the terminal control unit 110. The terminal control unit 110 transmits the received control information, or the like, toward the terminal 300 via the S1-IF processing unit 140, the X2-IF processing unit 145, or the like.

Now, when a base station 100 is the target base station 100-2 and a handover is performed at the terminal 300, the operation becomes as follows, for example.

Namely, the control information or the like transmitted from the source base station 100-1 or the EPC/GW 400 is transmitted to the own server control information processing unit 120 or the other server control information processing unit 130 via the X2-IF processing unit 145 or the S1-IF processing unit 140, respectively. In this case, the network capability information, other handover-related control information, or the like, may be received in the own server control information processing unit 120. The own server control information processing unit 120, on receiving a network capability request (which may be included in the HO Request or may be a new procedure), performs message exchange, or the like, with the EPC/GW 400 via the S1-IF processing unit 140, so as to collect network capability information. Alternatively, the own server control information processing unit 120 reads out from the memory 101 network capability information stored in the memory 101. Then, the own server control information processing unit 120 transmits the collected or read out network capability information to the source base station 100-1 via the X2-IF processing unit 145. In this case, the own server control information processing unit 120 may generate an HO Request Ack including network capability information, or may generate network capability information as a new procedure. Further, the own server control information processing unit 120, on receiving other handover-related control information, or the like, generates the handover-related control information, or the like, to transmit to the EPC/GW 400 and the source base station 100-1 via the S1-IF processing unit 140 and the X2-IF processing unit 145.

In both cases, the terminal control unit 110, the own server control information processing unit 120 and the other server control information processing unit 130 receive control information or the like via the information reception units 112, 122, 132 to transmit the control information or the like via the information request units 111, 121, 131.

When the base station 100 is the source base station 100-1, for example, each of the own server control information processing unit 120 and the other server control information processing unit 130 may be a control information request unit (or a controller) which requests the control information. Also, in this case, the terminal control unit 110 may be a transmission unit (or a transmitter) which transmits the handover-related control information or the like to the terminal 300, for example.

Further, when the base station 100 is the target base station 100-2, the own server control information processing unit 120 may be a control information notification unit (or a controller), for example.

<1.2 Packet Configuration Example>

Figure 9:
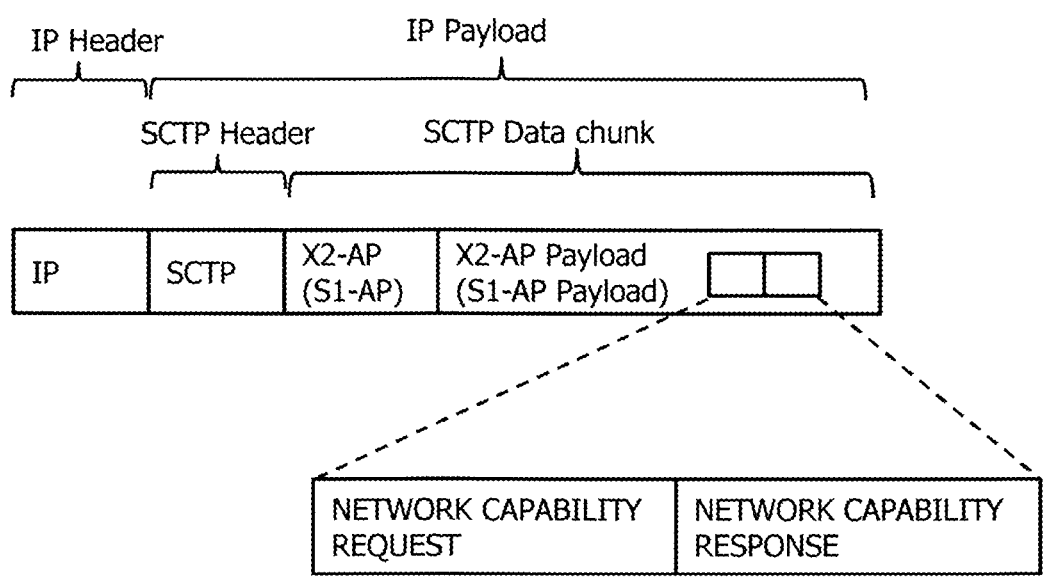
FIG. 9 is a diagram illustrating an example of a packet configuration.

When a network capability request and network capability information are exchanged between the base stations 100-1, 100-2, the X2 interface is used, for example. FIG. 9 illustrates a configuration example of packet data by the X2 interface. As depicted in FIG. 9, an SCTP (Stream Control Transmission Protocol) header and an SCTP data chunk area are included in the payload area of an IP packet. Further, an X2-AP (X2 Application Protocol) header and an X2-AP payload area are included in the SCTP data chunk area, whereas a network capability request and network capability information are included in the X2-AP payload area.

FIG. 10 is a diagram illustrating an example of an Information Element (IE) included in an HO Request. When a packet depicted in FIG. 9 is transmitted as HO Request, an information element of HO Request is included in the X2-AP payload area. Further, when a network capability request is included in the HO Request, as depicted in FIG. 10, "NW Capability Request Condition" is added to the HO Request, as a new information element. The above "NW Capability Request Condition" represents a network capability request, for example.

For example, the information element of the HO Request including the "NW Capability Request Condition" is generated by the other server control information processing unit 130 of the source base station 100-1. The other server control information processing unit 130 transmits the generated HO Request to the target base station 100-2 via the information request unit 131 and the X2-IF processing unit 145.

FIG. 11 is a diagram illustrating an example of an information element included in an HO Request Ack. When a packet depicted in FIG. 9 is transmits as HO Request Ack, for example, an information element of the HO Request Ack becomes included in the X2-AP payload area. Then, when network capability information is configured to be included in the HO Request Ack, as depicted in FIG. 11, "NW Capability" is added to the HO Request Ack as a new information element. The "NW Capability" represents network capability information, for example.

Additionally, each example of FIG. 10 and FIG. 11 is an example when the network capability request and the network capability information are transmitted by being included in the HO Request and the HO Request Ack, respectively. For example, the network capability request and the network capability information may be transmitted by being included in another message which is exchanged between the base stations 100-1 and 100-2 in the handover procedure. In both cases, the addition of new information elements enables the exchange of the above information, as depicted in FIG. 10 and FIG. 11.

A case of transmitting the network capability request and the network capability information in a new procedure becomes as follows, for example. Namely, as to the network capability request, the new procedure may be configured to include, as information elements, "Message Type" and "NW Capability Request Condition" among the information elements depicted in FIG. 10. Also, as to the network capability information, the new procedure may be configured to include, as information elements, "Message Type" and "NW Capability" among the information elements depicted in FIG. 11.

Further, FIG. 12 illustrates an example of each information element to be included in the broadcast information when the network capability information is transmitted as the broadcast information. The broadcast information is transmitted by being included in an SIB (System Information Block), for example. At present, SIB1 to SIB25 are existent in the SIB. The example depicted in FIG. 12 represents an example of information element in the case of SIB2. As depicted in FIG. 12, "NW Capability" is included in the SIB2, as a new information element, so that the network capability information of the target base station 100-2 is included in the "NW Capability" and transmitted. FIG. 12 depicts one example, and the network capability information may also be transmitted using other SIB including SIB1, SIB3-SIB25, or the like. In that case, each new information element becomes added as depicted in FIG. 12.

<1.3 Network Capability Information>

FIG. 14 illustrates an example of network capability information. The network capability information includes the information of, for example, a destination candidate, connection information, route information, transmission delay information and a supported service.

The destination candidate represents, for example, an application server 200 connected to the target base station 100-2. When the terminal 300 is handed over from the source base station 100-1 to the target base station 100-2 in the example of FIG. 2, "Application server A" comes to an application server located in the base station 100-2 whereas "Application server B" comes to an application server located in the S-GW 410-1, for example.

Referring back to FIG. 14, the connection information represents, for example, identification information to distinguish the application server 200 from another application server. In the example FIG. 14, the connection information is represented using an IP address. The connection information is used, for example, to identify a destination address to which the application state information of the application server 200 is to be passed over.

The route information represents, for example, a location where a handover destination application server 200 is located in the network. In the example FIG. 2, when the "Application server A" is located in the target base station 100-2, the route information is represented by "(P-GW 420-1)-(S-GW 410-1)-(base station 100-2)". For example, the route information is represented by linking each node from the P-GW 420 to which the application server 200 is subordinate to the application server 200.

Referring back to FIG. 14, the transmission delay information represents, for example, a time for service provision through a transmission route from the application server 200 to the terminal 300. For example, "10 ms" represents that it takes "10 ms" from when the application server A transmits data to when the terminal 300 receives the data. The transmission delay information is used, for example, to determine whether or not a requirement for transmission delay is satisfied upon continuation of the service provided by the application server 200.

The supported service represents, for example, quality of service to be provided, a service content, or the like. In the example of FIG. 14, "video distribution A" and "video distribution B" represent a video distribution service of an identical content, in which the "video distribution A" represents high quality, whereas "video distribution B" represents low quality. Also, "video distribution C" represents, for example, a video distribution service for a content which is different from the "video distribution A". The supported service is used, in some cases, to confirm whether or not a service provided by the handover destination application server 200 corresponds to a service having been provided by a handover source application server 200. The supported service may include a tolerable transmission delay time when each service is provided by the application server 200. The transmission delay time may be included on a service-by-service basis, like a tolerable transmission delay time for the "video distribution A" to be "10 ms", a tolerable transmission delay time for the "video distribution B" to be "15 ms", etc., for example.

In FIG. 14, for example, the "connection information" and the "route information" represent the location information of the application server 200, and the "transmission delay information" represents information related to a transmission capacity of the application server 200, and the "supported service" represents a service that can be provided. Network capability information including such information is included in an information element of "NW Capability" as depicted in FIG. 11, for example, so as to be transmitted from the target base station 100-2 to the source base station 100-1.

Hereinafter, a variety of operation examples using the operation example 1 and the operation example 2 will be described.

<3. Selection of Other Target Base Station>

The present operation example is an example when the source base station 100-1, after selecting a target base station 100-2, selects another target base station 100-3 according to network capability information.

Figure 16:
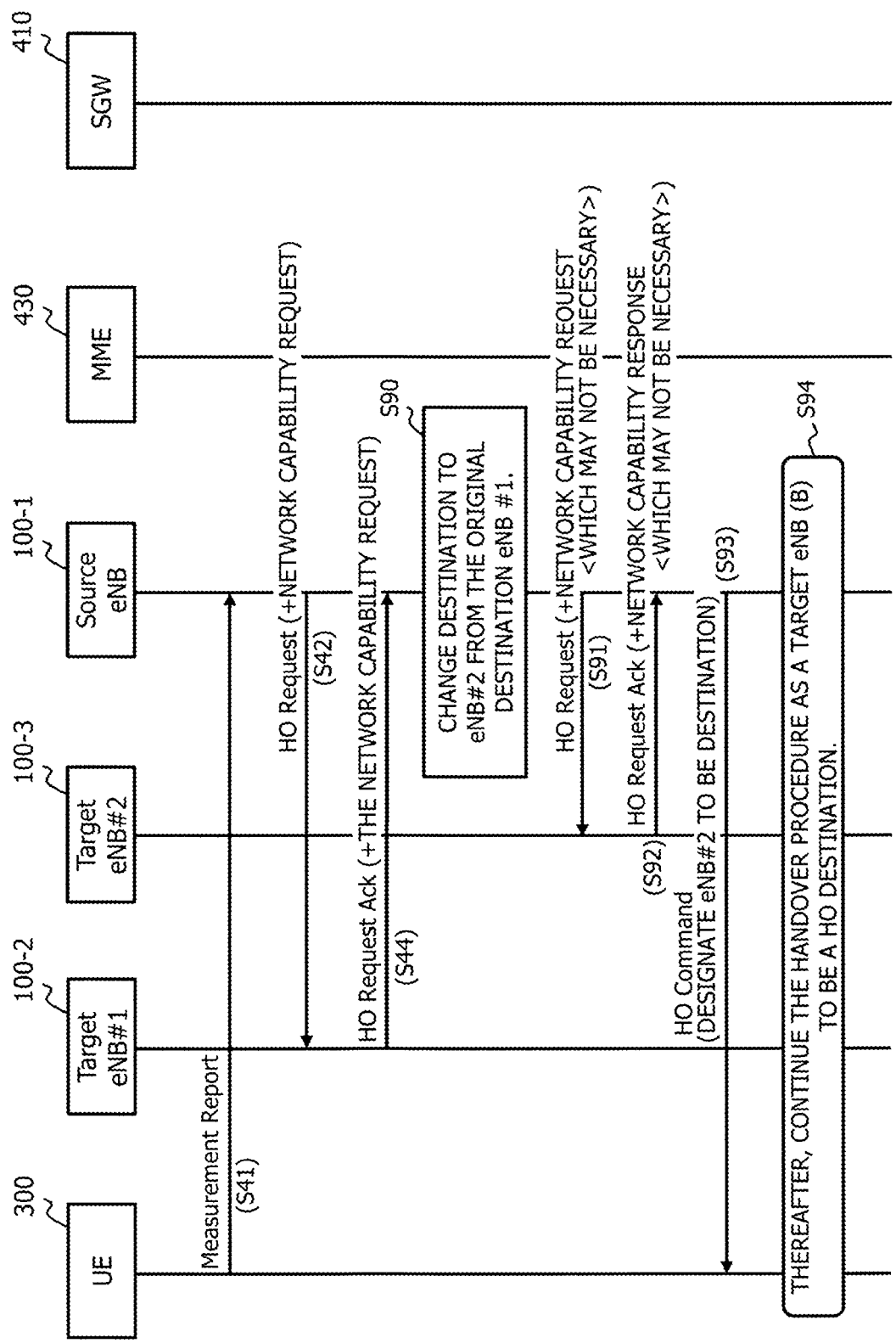
FIG. 16 is a sequence diagram illustrating an operation example in the case when a destination is changed.

FIG. 16 illustrates a sequence example of the present operation example.

The source base station 100-1 selects a target base station 100-2 according to a Measurement Report received from the terminal 300 (S41) to transmit an HO Request to the selected target base station 100-2 (S42). The source base station 100-1 transmits the HO Request by including a network capability request.

Next, the source base station 100-1 receives an HO Request Ack including network capability information (S44). At this time, the base station 100-1 charges a handover destination from the base station 100-2 to the base station 100-3 according to the network capability information (S90).

For example, processing as follows is performed. Namely, on receiving the network capability information from the target base station 100-2, the other server control information processing unit 130 of the source base station 100-1 outputs the received network capability information to the terminal control unit 110. The terminal control unit 110 changes the target base station 100-2 according to the network capability information. Specifically, the terminal control unit 110 may determine dependent on whether the "transmission delay time" and the "supported service" of the source application server 200-1 matches the "transmission delay time" and the "supported service" of the application server 200-2 or 200-3. On determining that capability information requested from the source application server 200-1 matches the capability information of the destination application server 200-3, the terminal control unit 110 changes handover target of the base station apparatus to the base station 100-3 connected to the application server 200-3. The terminal control unit 110 may be a radio channel control unit (or controller) to change the target base station from the base station 100-2 to the base station 100-3, for example.

Then, the source base station 100-1 transmits an HO Request to the base station 100-3 after the change (S91) to receive an HO Request Ack from the base station 100-3 (S92). In this case, it is possible for the source base station 100-1 not to include the network capability request in the HO Request, and also, it is possible for the target base station 100-2 not to include the network capability information in the HO Request Ack.

For example, the terminal control unit 110 of the source base station 100-1 generates the HO Request, and transmits the generated HO Request to the target base station 100-3 after the change via the X2-IF processing unit 145.

Thereafter, the source base station 100-1 transmits to the terminal 300 an HO Command including information which designates that the destination is the base station 100-3 (S93), so as to continue the handover procedure by determining the base station 100-3 to be a target base station (S94).

<4. Pre-Changeover>

The present operation example is an example in which, though having a partial overlap with the aforementioned <3. Selection of other target base station>, the source base station 100-1 changes over the application server 200 (or the target base station 100-2) in advance according to the network capability information having been collected in advance by the source base station 100-1. After the completion of the handover procedure, it is possible to resume communication between the terminal 300 and the application server 200 at a time point when the communication changeover of the terminal 300 with the target base station 100-2 is completed.

Figure 17:
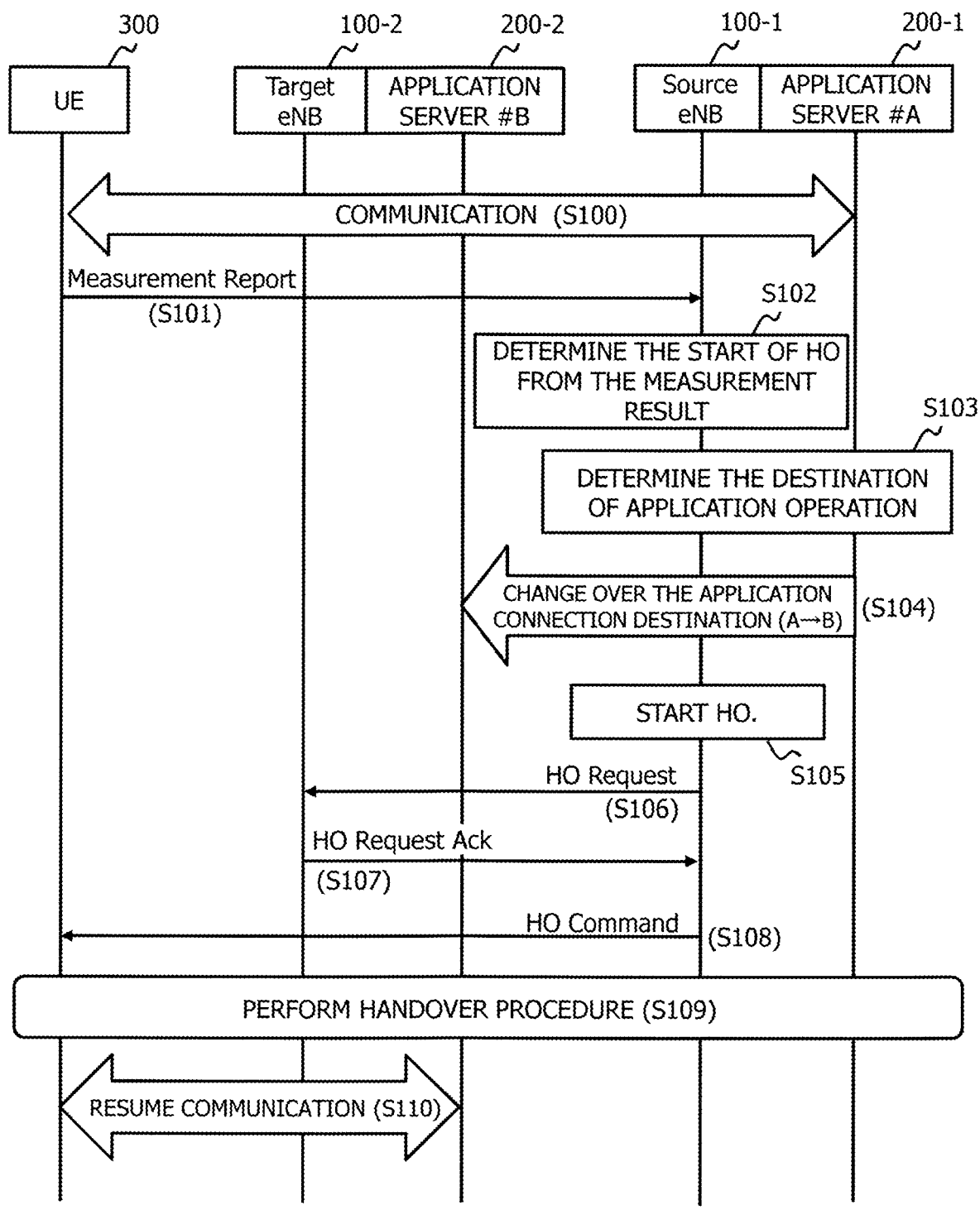
FIG. 17 is a sequence diagram illustrating an operation example of a pre-changeover.

FIG. 17 illustrates a sequence example in the present operation example. It is assumed that, in the source base station 100-1, the collection of the network capability of the application server 200-2 from the target base station 100-2 has already been completed.

The terminal 300 receives service provision from the application server 200-1 (S100) to transmit a Measurement Report to the source base station 100-1 (S101).

The source base station 100-1 determines from the measurement result to start a handover (S102), and determines the application server 200-2 to be a changeover destination according to the network capability information collected in advance (S103). For example, the own server control information processing unit 120 of the source base station 100-1 decides to change the changeover destination of the application server 200 from the application server 200-1 to the application server 200-2, according to network capability information which is read out from the memory 101. The own server control information processing unit 120 may be a channel control unit (or controller) which decides the changeover destination of the application server 200, for example.

Then, the source base station 100-1 starts to hand over (S105) to exchange an HO Request and an HO Request Ack with the target base station 100-2 which includes the application server 200-2 (S106, S107).

Thereafter, the source base station 100-1 transmits to the terminal 300 an HO Command, which includes information designating the base station 100-2 as a handover destination (S108) to continue the handover procedure (S109).

After the handover procedure is completed, the terminal 300 comes to receive service provision from the application server 200-2 (S110).

As to the changeover of the application server 200 (S104), for example, the source base station 100-1 may perform such a decision, or the application server 200-1 before the changeover may transmit a changeover message to the application server 200-2 of the changeover determination. In the latter case, the following processing is performed, for example.

Namely, the terminal control unit 110 of the source base station 100-1, on receiving the Measurement Report, reads out the network capability information stored in the memory 101. The terminal control unit 110 then transmits a generated changeover instruction to the application server 200-1 via the S1-IF processing unit 140. The data analysis unit 220 of the application server 200-1, on receiving the changeover instruction via the data transmission and reception unit 210, generates a changeover message destined to the changeover destination application server 200-2 according to the above changeover instruction. The data analysis unit 220 transmits the changeover message via the data transmission and reception unit 210 to the application server 200-2. The data analysis unit 220 of the application server 200-2 prepares to start providing the service to the terminal 300 according to the received changeover message.

<5. Changeover of the Application Server after HO>

Next, a description will be given of an example in which the target base station 100-2 changes over the connection of the application server 200 after HO.

Figure 18:
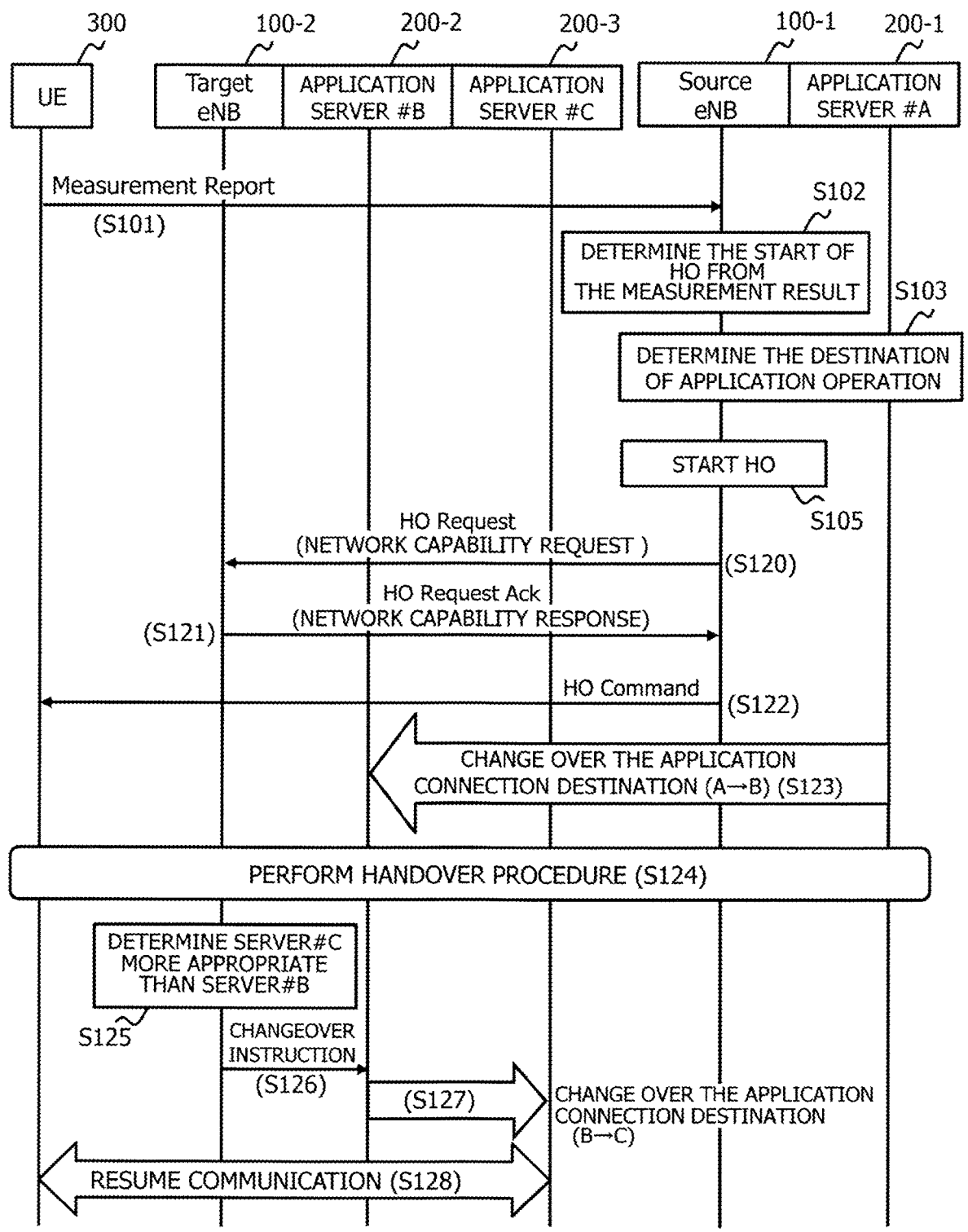
FIG. 18 is a sequence diagram illustrating an example of server change operation after a handover.

FIG. 18 illustrates a sequence example of the present operation example.

The source base station 100-1, on receiving a Measurement Report from the terminal 300 (S101), determines about the start of handover (S102) and decides the destination of the application server 200 (S103). In this case, the source base station 100-1 may decide the target base station 100-2 according to the network capability information collected in advance, in a similar manner to the aforementioned example. In the example of FIG. 18, there is illustrated an example in which the source base station 100-1 decides the handover destination without collection in advance.

Next, on starting the handover (S105), the source base station 100-1 transmits an HO Request including a network capability request to the target base station 100-2 (S120).

Next, the source base station 100-1 receives an HO Request Ack including network capability information from the target base station 100-2 (S121) to transmit to the terminal 300 with an HO Command (S122).

Next, the source base station 100-1 charges over the connection of the application server 200-1 to the application server 200-2 (S123) to continue the handover procedure (S124).

After the handover procedure is completed, the target base station 100-2 decides to change the connection destination from the application server 200-2 to the application server 200-3, according to the network capability information (S125).

For example, processing as follows is performed. Namely, the own server control information processing unit 120 of the target base station 100-2 changes the connection destination of the application server 200 according to the network capability information stored in the memory 101. Specifically, the own server control information processing unit 120 compares the network capability information of the application server 200-1 with the network capability information of the application server 200-2. Also, the own server control information processing unit 120 compares the network capability information of the application server 200-1 with the network capability information of the application server 200-2. Then, the own server control information processing unit 120, on determining that a condition in the latter matches better than in the former, performs to change to the application server 200-3. The own server control information processing unit 120 may be a channel control unit (or a controller) which changes the application server, for example.

Next, the target base station 100-2 transmits a changeover instruction to the changeover source application server 200-2 (S126).

Then, a changeover between the application server 200-2 and the application server 200-3 is performed (S127), so that communication is resumed (S128).

For example, processing as follows is performed. Namely, the terminal control unit 110 of the target base station 100-2, on receiving a notification of a connection server change from the own server control information processing unit 120, generates the changeover instruction. The terminal control unit 110 transmits the changeover instruction to the application server 200-2. The data analysis unit 220 of the application server 200-2 receives the changeover instruction to interrupt the service provision to the terminal 300. The data analysis unit 220 then transmits the changeover instruction via the data transmission and reception unit 210 to the application server 200-3 of the changeover destination. The data analysis unit 220 of the application server 200-3 receives the changeover instruction via the data transmission and reception unit 210, and decides to start providing the service to the terminal 300 and then notifies the application unit 230.

Then, communication between the terminal 300 and the application server 200-3 is resumed (S128). For example, the application unit 230 starts providing the service to the terminal 300 according to the notification from the data analysis unit 220.

<6. Notification of Application State Information>

Next, a description will be given of an operation example about application state information and the notification thereof.

Figure 19:
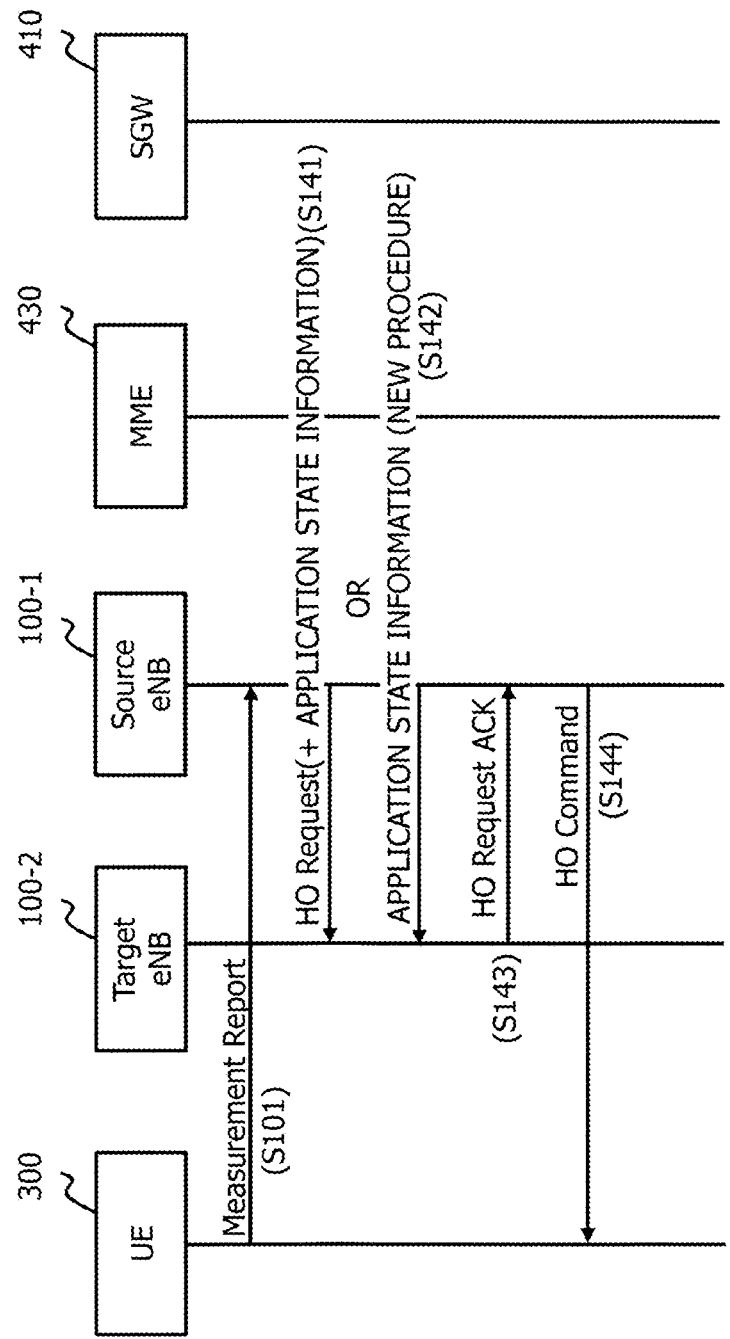
FIG. 19 is a sequence diagram illustrating an example of the transmission of application state information.

FIG. 19 illustrates a sequence example of the present operation example. The source base station 100-1, on receiving a Measurement Report from the terminal 300 (S101), transmits application state information to the target base station 100-2. As to the transmission of the application state information, it is possible to transmit using an HO Request (S141) or as a new procedure (S142) in a similar manner to FIGS. 8 (A) and 8 (B).

FIG. 20 (A) illustrates a configuration example of a packet using an RTP (Real-time Transfer Protocol) protocol, and FIG. 20 (B) illustrates an example of RTCP information transmitted by an RTCP (Real-time Transport Control Protocol). The RTCP information is encapsulated into the payload area of an RTP packet, and content data etc. are inserted also, so as to be transmitted to a transmission destination.

For example, in some cases, by use of a CDN, the application server 200 receives an RTP packet transmitted from another server apparatus which is connected via the CDN, to perform streaming distribution using the RTP (for example, FIG. 1). In this case, the application server 200 can extract RTCP information from the RTP packet received via the CDN. In the RTCP information, there are included a stream data amount transmitted to the application server 200 and a transmission time (or a distribution time) with respect to the transmitted stream, such as SR (Sender Report), for example.

Accordingly, the application server 200 can extract from the RTP packet the data amount and the distribution time of the service having been distributed to the terminal 300 from the RTCP information.

For example, processing as follows may be performed. Namely, when the data analysis unit 220 of the application server 200-1, which is connected to the source base station 100-1, receives an RTP packet via the data transmission and reception unit 210 and the CDN, the data analysis unit 220 extracts SR information of the RTCP information, and then transmits the extracted SR information to the source base station 100-1. On receiving the SR information, the own server control information processing unit 120 of the source base station 100-1 generates application state information including the SR information. The own server control information processing unit 120 generates either an HO Request including the application state information or a new procedure including the application state information, to transmit to the target base station 100-2.

When the application state information is included in the HO Request, for example, an information element related to the application state information may be added to the information element of the HO Request, as depicted in FIG. 10. For example, the above information element may be added next to "NW Capability Request Condition".

Also, when the transmission is made as a new procedure, for example, "Message Type" and "NW Capability Request condition" may be included in the information element depicted in FIG. 10, and further a new information element representing the application state information may be added.

Referring back to FIG. 19, the source base station 100-1, after transmitting the application state information to the target base station 100-2 (S141 or S142), receives an HO Request Ack from the target base station 100-2 (S143) and then transmits an HO Command to the terminal 300 (S144).

Here, the source base station 100-1 may generate an HO Request, which includes the application state information and a network capability request, to transmit to the target base station 100-2 (S141, S142). Also, the source base station 100-1 may generate and transmit a new procedure including the application state information and a network capability request.

<Overall Operation Example>

Next, an example of overall operation will be described.

Figure 21:
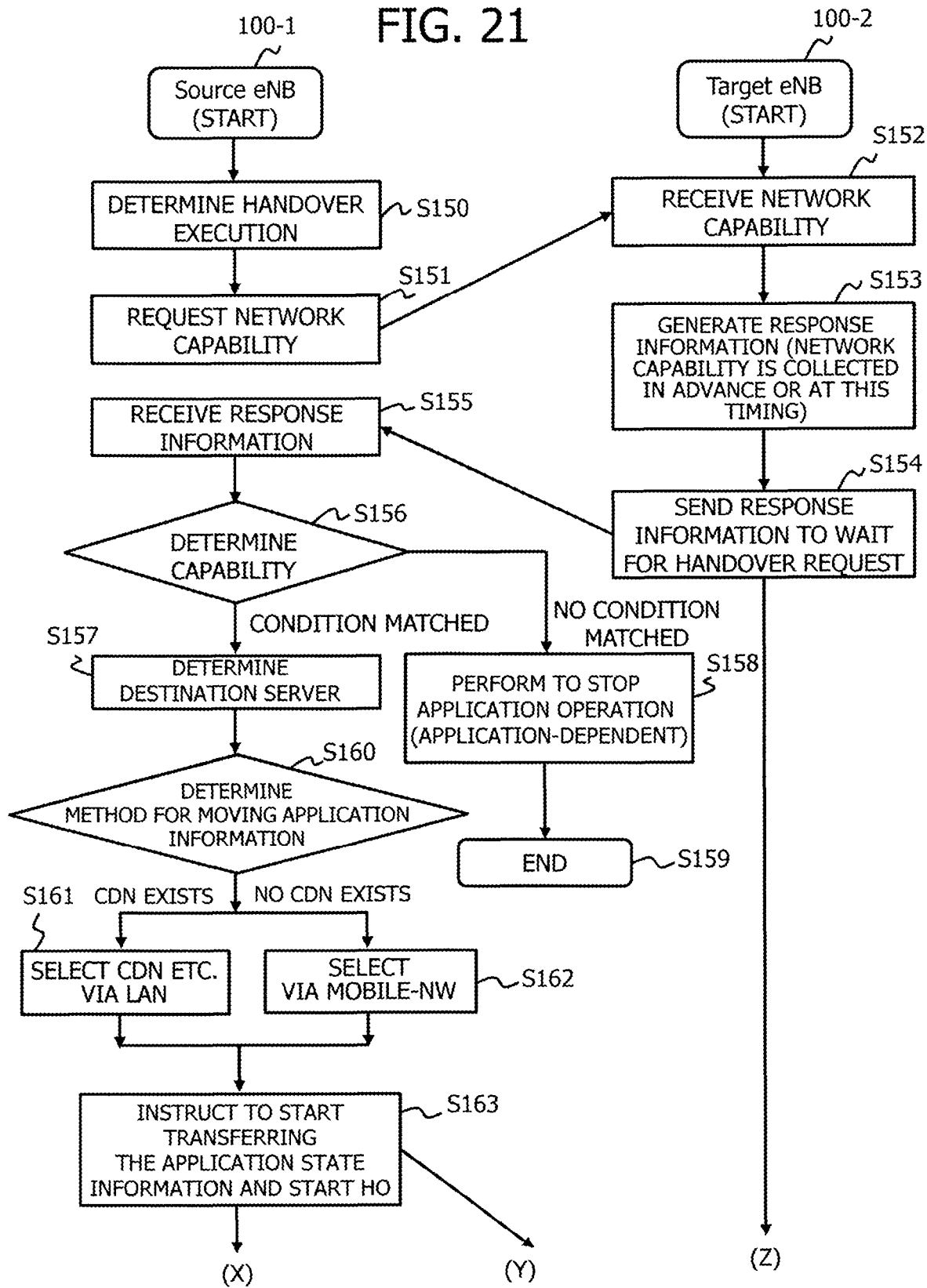
FIG. 21 is a flowchart illustrating an example of overall operation.
Figure 22:
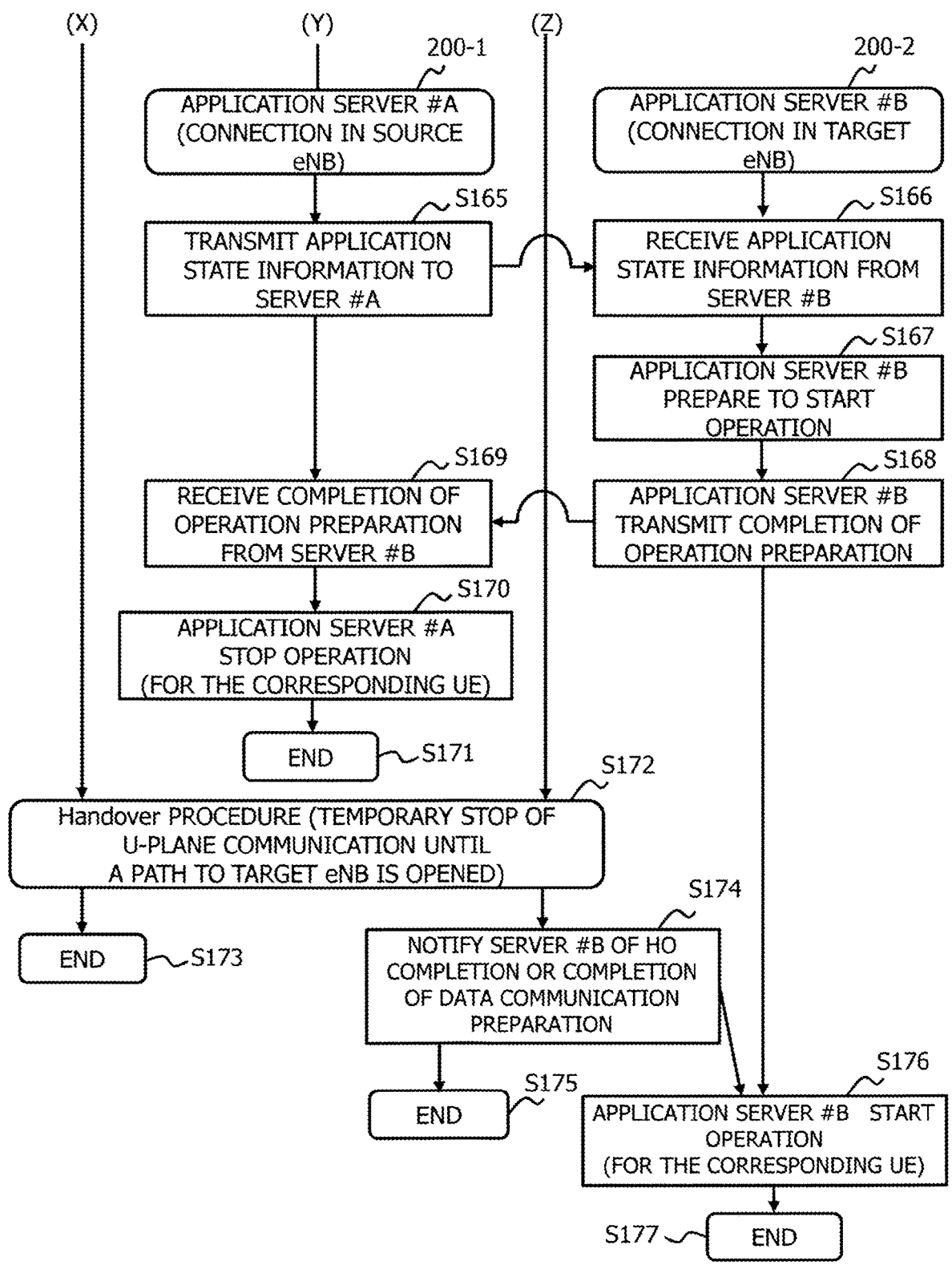
FIG. 22 is a flowchart illustrating an example of overall operation.

FIGS. 21, 22 are flowcharts illustrating the overall operation example. For some parts, brief description may be given because of having already been described.

The source base station 100-1, on starting processing, decides about the execution of handover (S150). For example, the terminal control unit 110 of the source base station 100-1 determines about the execution of handover execution according to information included in the received Measurement Report. In the following, a description is given based on an assumption that the terminal control unit 110 determines to execute the handover.

Next, the source base station 100-1 transmits a network capability request to the target base station 100-2 (S151). The network capability request may be included in an HO Request or may be transmitted in a new procedure (for example, FIG. 8 (A) and FIG. 8 (B)).

Meanwhile, the target base station 100-2 starts processing to receive the network capability request from the source base station 100-1 (S152).

Next, the target base station 100-2 generates network capability information (S153), and transmits the generated network capability information to the source base station 100-1 (S154). The target base station 100-2 then waits for the reception of a handover request (S154).

Meanwhile, the source base station 100-1, on receiving the network capability information (S155), determines the presence or absence of network capability information which matches the condition of the source application server 200-1 (S156).

For example, the following processing is performed. Namely, the other server control information processing unit 130 of the source base station 100-1, on receiving the network capability information, outputs the received network capability information to the own server control information processing unit 120. The own server control information processing unit 120 reads out from the memory 101 the network capability information of the application server 200-1 which is connected to the source base station 100-1. The own server control information processing unit 120 determines by comparing the network capability information of the own application server 200-1 with the network capability information received from the target base station 100-2. As a comparison method, for example, it is possible to perform based on whether or not the former network capability information matches the latter network capability information, or whether or not the latter network capability information satisfies the former network capability information, or the like.

If there is network capability information that matches a condition (if "condition matched" in S156), the source base station 100-1 decides a destination server (S157).

For example, the following processing is performed. Namely, if there is network capability information that matches the network capability information of the application server 200-1, the other server control information processing unit 130 decides an application server 200-2, having the network capability information of concern, to be the destination server.

On the other hand, if there is no network capability information that matches the condition (if "no condition matched" in S156), the source base station 100-1 stops the operation of the application server 200-1 which is connected to the source base station 100-1 (S158).

For example, processing as follows is performed. Namely, when there is no network capability information that matches the network capability information of the application server 200-1, the own server control information processing unit 120 decides to stop the application server 200-1. The own server control information processing unit 120 transmits a stop command to the application server 200-1. The data analysis unit 220 of the application server 200-1, on receiving the stop command, instructs the application unit 230 to stop the service provision to the terminal 300, and according to the instruction, the application unit 230 stops the service provision.

Then, the source base station 100-1 completes a series of processing (S159).

Meanwhile, on deciding the destination server (S157), the source base station 100-1 determines a transmission method of the application state information (S160). Here, the source base station 100-1 decides how to transmit the application state information. For example, if a CDN is connected in the application server 200-1, the source base station 100-1 determines "CDN exists", whereas if no CDN is connected, determines "No CDN exists". For example, the own server control information processing unit 120 may determine by reading out the information of the application server 200, related to the existence or non-existence of CDN connection, which is stored in the memory 101.

If a CDN is connected to the application server 200-1 ("CDN exists" in S160), the source base station 100-1 selects the CDN (S161). On the other hand, if a CDN is not connected ("No CDN exists" in S162), the source base station 100-1 selects a mobile network (S162). For example, the own server control information processing unit 120 performs the determination of selection.

Next, the source base station 100-1 instructs to start transferring application state information, and starts the handover (S163).

For example, the following processing is performed. Namely, the own server control information processing unit 120 generates a transfer start instruction indicating whether to transmit via the CDN or transmit via the mobile network, so as to transmit to the application server 200-1. Also, the own server control information processing unit 120 instructs the terminal control unit 110 to start the handover.

Next, the application server 200-1 transmits the application state information to the destination application server 200-2 (S165 in FIG. 22).

For example, the following processing is performed. Namely, the data analysis unit 220 of the application server 200-1, on receiving the transfer start instruction, extracts from an RTP packet a data amount and a distribution time transmitted to the terminal 300, so as to generate application state information including the data amount and the distribution time. The data analysis unit 220 then transmits the application state information to a transfer destination (here, the application server 200-2) included in the transfer start instruction.

Next, the destination application server 200-2 receives the application state information (S166). For example, the data analysis unit 220 of the application server 200-2 receives the application state information via the data transmission and reception unit 210.

Next, the application server 200-2 prepares for starting service provision to the terminal 300 (S167).

For example, the following processing is performed. Namely, the data analysis unit 220 of the application server 200-2, on receiving the application state information, instructs the application unit 230 to start preparation. The application unit 230 performs the preparation by reading out service-related user data or the like stored in the memory 204.

Next, on completion of the preparation, the application server 200-2 transmits the completion of operation preparation to the application server 200-1 (S168).

For example, the following processing is performed. Namely, on completion of reading out from the memory 204 user data destined to the terminal 300, the application unit 230 notifies the data analysis unit 220 to that effect. On receiving the notification, the data analysis unit 220 determines the operation preparation is completed.

The data analysis unit 220 then notifies the application server 200-1 of the operation preparation completion via the data transmission and reception unit 210.

On receiving the completion of operation preparation (S169), the application server 200-1 stops service provision to the terminal 300 (S170). The application server 200-1 then completes a series of processing (S171).

For example, the following processing is performed. Namely, on receiving the completion of operation preparation, the data analysis unit 220 of the application server 200-1 instructs the application unit 230 to stop the service provision to the terminal 300. On receiving the instruction, the application unit 230 stops the service.

Meanwhile, the source base station 100-1 and the target base station 100-2 execute the handover procedure (S172). On completion of the handover procedure, the source base station 100-1 completes a series of processing (S173).

Also, the target base station 100-2, on completion of the handover procedure, sends the handover completion notification or the completion of data communication preparation to the application server 200-2 (S174).

For example, the following processing is performed. Namely, the terminal control unit 110 of the target base station 100-2, on completion of the handover procedure, notifies the own server control information processing unit 120 to that effect. The own server control information processing unit 120 generates a message, which represents the handover completion notification or the completion of data communication preparation, to transmit to the application server 200-2.

The application server 200-2, on receiving the notification of the handover completion or the completion of data communication preparation, starts providing the service to the terminal 300 (S176). The application server 200-2 then completes a series of processing (S177).

For example, the following processing is performed. Namely, the data analysis unit 220 of the application server 200-2, on receiving a message representing the completion of handover or the completion of data communication preparation, instructs the application unit 230 to start providing a service to the terminal 300. On receiving the instruction, the application unit 230 starts providing the service to the terminal 300.

As such, in the present first embodiment, for example, the target base station 100-2 transmits the network capability information to the source base station 100-1 (S154 in FIG. 21, etc.). Therefore, it is also possible for the source base station 100-1 to select the destination application server 200-2 according to the network capability information (for example, "location information") (FIG. 17). Further, it is also possible for the target base station 100-2 to change to the application server 200-3 according to the network capability information, after executing the handover. Because the source base station 100-1 or the target base station 100-2 selects the application server 200-2 or 200-3 according to the network capability information, it becomes possible to continue the service which is distributed from the source application server 200-1. Specifically, for example, the service can be continued by the selection of the application server 200-2, 200-3 having network capability information that matches the "transmission delay" and the "supported service" of the application server 200-1.

Also, the transmission of the network capability information is performed, for example, during from the Measurement Report to the HO Command (FIG. 8 (A), FIG. 8 (B), or the like, for example). Accordingly, the transmission of the network capability information can be performed earlier as compared to a case of transmitting the network capability information after the completion of the handover procedure. Thus, for example, service resumption from the application server 200 can be performed earlier as compared to the case of transmitting the network capability information after the completion of the handover procedure. Accordingly, it becomes possible to promptly resume the service to the terminal apparatus. Also, it becomes possible to reduce an interruption time, caused by the handover, in the service provided by the application server 200. From the above, it becomes possible to improve transmission speed related to the service provision, with an increased throughput.

Further, the source base station 100-1 is configured to transmit to the target base station 100-2 the application state information that includes a delivery time distributed from the application server 200-1 to the terminal 300, a data amount, or the like (FIG. 19). Accordingly, it becomes possible for the application server 200-2 to succeed the application state information to provide the service in continuation from the service having been distributed so far. Accordingly, it becomes possible to continue providing the service to the terminal 300.

Other Embodiments

Next, other embodiments will be described.

Figure 23:
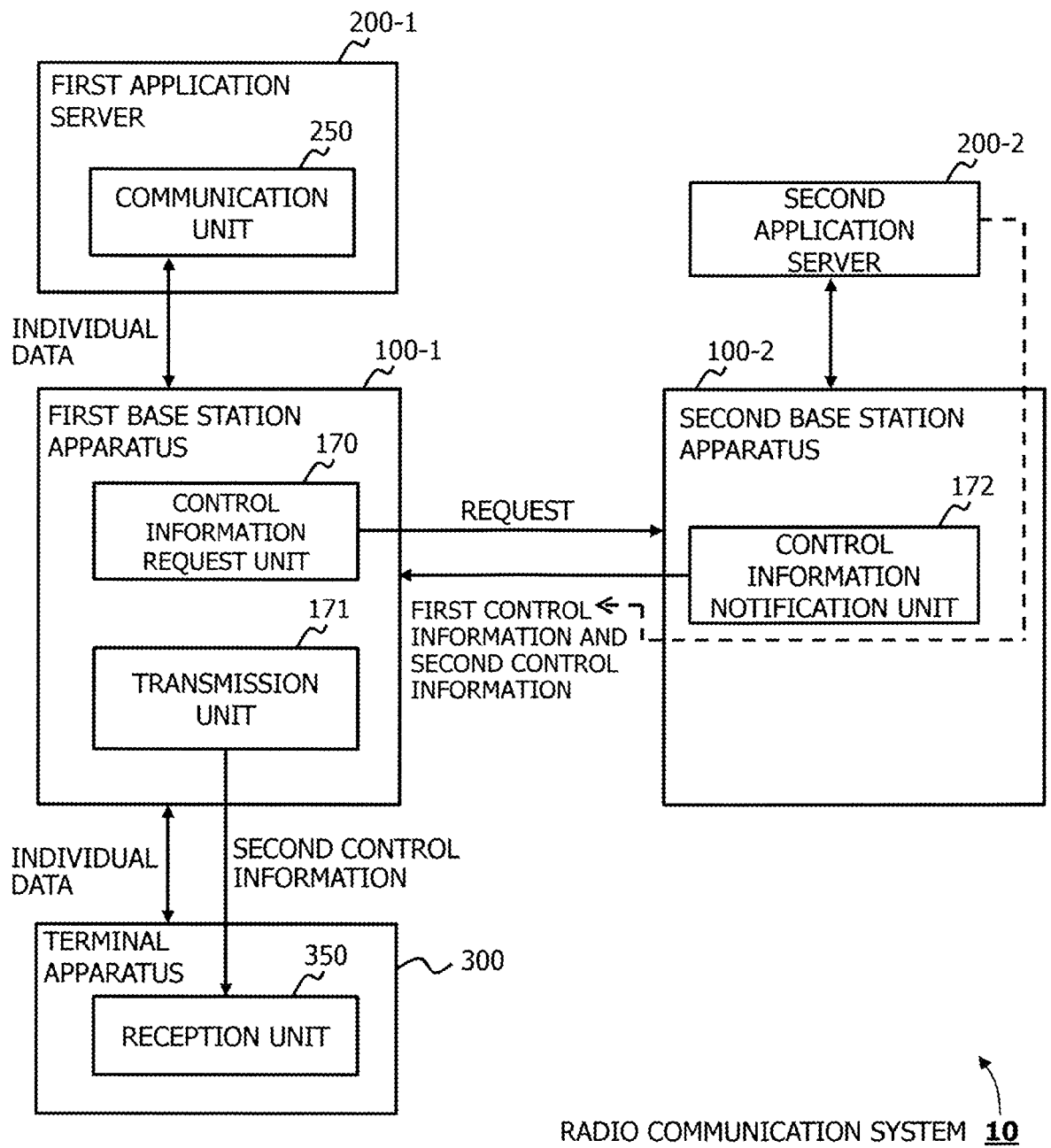
FIG. 23 is a diagram illustrating a configuration example of a radio communication system.

FIG. 23 is a diagram illustrating a configuration example of a radio communication system 10.

The radio communication system 10 includes a first and a second base station apparatus 100-1, 100-2, a first and a second application server 200-1, 200-2, and a terminal apparatus 300. For example, the first base station apparatus 100-1 is a source base station, and the second base station apparatus 100-2 is a target base station.

The first application server 200-1 includes a communication unit (or communicator) 250. The communication unit 250 transmits and receives individual data between with the terminal apparatus 300 via the first base station apparatus 100-1.

The first base station apparatus 100-1 includes a control information request unit (or a first controller) 170 and a transmission unit (or a transmitter) 171. The control information request unit 170 requests of the second base station apparatus 100-2 first control information related to the second application server 200-2 which is connected to the second base station apparatus 100-2, and second control information used for the terminal apparatus 300 to connect to the second base station apparatus 100-2. The transmission unit 171 transmits to the terminal apparatus 300 at least the second control information notified from the second base station apparatus 100-2.

The second base station apparatus 100-2 includes a control information notification unit (or a second controller) 172. The control information notification unit 172 notifies the first base station apparatus 100-1 of the first and second control information.

The terminal apparatus 300 includes a reception unit (or a receiver) 350. The reception unit 350 receives at least the second control information from the first base station apparatus 100-1.

As such, in the present embodiment, the first base station apparatus 100-1 requests the first control information related to the second application server 200-2, so that the second base station apparatus 100-2 notifies the first base station apparatus 100-1 of the first control information. Thus, based on the first control information, the first base station apparatus 100-1 can determine whether or not the same service as the service provided from the first application server 200-1 to the terminal apparatus 300 can be provided from the second application server 200-2, for example. Further, based on the result of determination, the first base station apparatus 100-1 can also determine whether or not the second base station apparatus 100-2 is decided to be the connection destination of the terminal apparatus 300.

Accordingly, for example, if the terminal apparatus 300 changes over its connection from the first base station apparatus 100-1 to the second base station apparatus 100-2, the present radio communication system 10 can continue providing the service, which is the same as the service provided from the first application server 200-1, from the second application server 200-2.

Also, the first base station apparatus 100-1 requests the first control information together with the second control information, for example. Further, the second base station apparatus 100-2 sends the notification of the first control information together with the second control information, for example. In this case, for example, the request for the first control information and the notification of the first control information are executed in a series of procedure for changing over the connection of the terminal apparatus 300. Therefore, the present embodiment is prompter than a case when the request for the first control information and the notification of the first control information are performed after the completion of the series of procedure including the request for the second control information and the notification of the second control information. Thus, in the present radio communication system 10, it is possible to promptly start providing the service from the application server 200-2 to the terminal apparatus 300 if the terminal apparatus 300 is changed over to the second base station apparatus 100-2.

Additionally, the communication unit 250 of the first application server 200-1 corresponds to, for example, the data transmission and reception unit 210 and the data analysis unit 220 in the first embodiment.

Also, the control information request unit 170 in the first base station apparatus 100-1 corresponds to, for example, the terminal control unit 110 and the other server control information processing unit 130 in the first embodiment. Further, the transmission unit 171 corresponds to, for example, the terminal control unit 110 in the first embodiment.

Further, the control information notification unit 172 in the second base station apparatus 100-2 corresponds to, for example, the other server control information processing unit 130 in the first embodiment.

Also, the reception unit 350 in the terminal apparatus 300 corresponds to, for example, the radio HW 330 in the first embodiment.

In the above-mentioned embodiments including the first embodiment, the description has been given of an example in which, for example, the network capability request and the network capability information are directly exchanged between the base stations 100-1 and 100-2, using the X2 interface. The network capability request and the network capability information may be exchanged between the base stations 100-1, 100-2 via the MME 430, using the S1 interface, for example. A packet configuration example in this case is as depicted in FIG. 9, for example. The network capability request and the network capability information may be transferred by being included in the S1-AP payload area, for example. In this case also, as depicted in FIG. 10, FIG. 11, or the like, for example, the network capability request and the network capability information may be included, as new information elements, in an HO Required etc. used in the handover sequence. Alternatively, a new procedure including the network capability request and the network capability information may be transferred. Such a message may be generated in the terminal control unit 110 and the other server control information processing unit in the base station 100 and notified, similar to the first embodiment, for example. Also, the network capability request and the network capability information may be generated in the terminal control unit 110 and the other server control information processing unit 130 in the base station 100 and notified, similar to the first embodiment for example.

Further, in the first embodiment, a processor or a controller, such as a CPU 102, an MPU (Micro-processing Unit), an FPGA (Field Programmable Gate Array), or the like, may be used in the base station 100, in place of the DSP 105. In the application server 200 also, a processor or a controller, such as a DSP, an MPU, an FPGA, or the like, may be used in place of the CPU 201. Further, in the terminal 300 also, a processor or a controller, such as a DSP, an MPU and an FPGA may be used in place of the CPU 302, and also, a CPU, an MPU, an FPGA, or the like, may be used in place of the DSP 305.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

| | |
|---|---|
| 10: Radio communication system | 110: Base station apparatus (eNB) |
| 100-1: Source base station | 100-2: Target base station |
| 101: Memory | 102: CPU |
| 105: DSP | 110: Terminal control unit |
| 111: Information request unit | 112: Information reception unit |
| 120: Own application server control information processing unit | |
| 121: Information request unit | 122: Information reception unit |
| 130: Other application server control information processing unit | |
| 131: Information request unit | 132: Information reception unit |
| 140: S1-IF processing unit | 145: X2-IF processing unit |
| 160: Radio processing unit | 200: Application server |
| 201: CPU | 204: Memory |
| 210: Data transmission and reception unit | |
| 220: Data analysis unit | 230: Application unit |
| 300: Terminal apparatus | 330: Radio HW |
| 400: EPC/GW | |

What is claimed is:

1. A radio communication system comprising:
a first base station apparatus, a second base station apparatus, and a third base station apparatus;
a first application server, a second application server, and a third application server; and
a terminal apparatus, wherein the first application server includes:
a transceiver configured to transmit to and receive from the terminal apparatus individual data via the first base station apparatus, the first base station apparatus includes:
a first controller configured to request from the second base station apparatus first control information regarding the second application server connected to the second base station apparatus and second control information for the terminal apparatus to connect to the second base station apparatus, and
a transmitter configured to transmit to the terminal apparatus the second control information received from the second base station apparatus, at least,
the second base station apparatus includes:
a second controller configured to report the first and second control information to the first base station apparatus,
the terminal apparatus includes:
a receiver configured to receive at least the second control information from the first base station apparatus, wherein
the first controller is configured to change a connection destination of the terminal apparatus from the second base station apparatus to the third base station apparatus based on the first control information, third control information regarding the first application server, and fourth control information regarding the third application server connected to the third base station apparatus.

2. The radio communication system according to claim 1, wherein
the first control information includes, at least one of:
connection information of the second application server in the radio communication system, and
information regarding to a route or transmission delay between the second base station apparatus and the second application server.

3. The radio communication system according to claim 1, wherein the first controller is configured to previously or periodically collect the first control information.

4. The radio communication system according to claim 1, wherein
the first controller is configured to change a communication destination of the individual data from the first application server to the second application server, before changing the connection destination of the terminal apparatus.

5. The radio communication system according to claim 1, wherein
the second controller is configured to change a communication destination of the individual data from the second application server to the third application server based on the first control information, after the terminal apparatus completed connection to the second base station apparatus.

6. The radio communication system according to claim 1, further comprising:
a third controller configured to transmit to the second application server application state information including data amount or transmission time of the individual data transmitted from the first application server to the terminal apparatus.

7. The radio communication system according to claim 2, wherein the connection information of the second application server in the radio communication system indicates position of the second application server.

8. The radio communication system according to claim 2, wherein the information regarding to transmission delay indicates time until the terminal apparatus receives the individual data transmitted from the second application server.

9. The radio communication system according to claim 2, wherein the first control information includes information regarding to a providable service to the terminal apparatus by the second application server.

10. The radio communication system according to claim 9, wherein the information regarding to the providable service includes time until the terminal apparatus receives the service provided from the second application server.

11. The radio communication system according to claim 1, wherein
the first controller is configured to transmit a first message included in a request for the first control information to the second base station apparatus when the terminal apparatus is to change connection from the first base station apparatus to the second base station apparatus, and the second controller is configured to transmit a second message included in the first control information to the first base station apparatus when the terminal apparatus is to change connection from the first base station apparatus to the second base station apparatus.

12. The radio communication system according to claim 11, wherein the first message is a Handover Request message, and the second message is a Hanover Request Acknowledgement message.

13. The radio communication system according to claim 11, wherein the first controller is configured to insert the request for the first control information in a first information element transmitted in the request for the first control information, and transmits a Handover Request message included in the first information element to the second base station apparatus, and the second controller is configured to insert the first control information in a second information element transmitted in the first control information, and a Handover Request Acknowledgement message included in the second information element to the first base station apparatus.

14. The radio communication system according to claim 1, wherein the first controller is configured to insert a request for the first control information in a Data Chunk area of SCTP (Stream Control Transmission Protocol) and transmit the request for the first control information, and the second controller is configured to insert the first control information in the Data Chunk area of the SCTP and transmit the first control information.

15. The radio communication system according to claim 1, wherein the first controller is configured to insert a request for the first control information in a payload area of X2-AP (X2 Application Protocol) and transmit the request for the first control information, and the second controller is configured to insert the first control information in the payload area of the X2-AP and transmit the first control information.

16. The radio communication system according to claim 5, wherein the second controller is configured to change the communication destination of the individual data from the second application server to the third application server based on the first control information, third control information regarding to the first application server, and fifth control information regarding a fourth application server connected to the second base station apparatus.

17. The radio communication system according to claim 6, wherein the third controller is configured to acquire the data amount or the transmission time from RTCP (Real-time Transmission Control Protocol) information included in an RTP (Real-time Transport Protocol) packet received from another apparatus connected via a CDN (Content Delivery Network).

18. A base station apparatus connected to a first application server, the base station apparatus comprising:

a controller configured to request from a second base station apparatus first control information regarding a second application server connected to the second base station apparatus and second control information for a terminal apparatus to connect the second base station apparatus; and a transmitter configured to transmit to the terminal apparatus the second control information received from the second base station apparatus, at least, wherein the controller is configured to change a connection destination of the terminal apparatus from the second base station apparatus to a third base station apparatus based on the first control information, third control information regarding the first application server, and fourth control information regarding a third application server connected to the third base station apparatus.

19. A base station apparatus connected to an application server, the base station apparatus comprising:

a receiver configured to receive a request for first control information regarding the application server and second control information for a terminal apparatus to connect to the base station apparatus, transmitted from a second base station apparatus; and a controller configured to report the first and second control information to the second base station apparatus wherein the second base station is configured to change a connection destination of the terminal apparatus from the base station apparatus to a third base station apparatus based on the first control information, third control information regarding a second application server connected to the second base station, and fourth control information regarding a third application server connected to the third base station apparatus.

20. A control information transmission method in a radio communication system including a first base station apparatus, a second base station apparatus, a third base station apparatus, a first application server, a second application server, a third application server, and a terminal apparatus, the method comprising:

transmitting to and receiving from the terminal apparatus individual data via the first base station apparatus by the first application server;

requesting from the second base station apparatus first control information regarding the second application server connected to the second base station apparatus and second control information for the terminal apparatus to connect to the second base station apparatus, by the first base station apparatus;

transmitting to the terminal apparatus the second control information received from the second base station apparatus, at least, by the first base station apparatus;

reporting the first and second control information to the first base station apparatus, by the second base station apparatus;

receiving the second control information from the first base station apparatus at least, by the terminal apparatus; and changing a connection destination of the terminal apparatus from the second base station apparatus to the third base station apparatus based on the first control information, third control information regarding the first application server, and fourth control information regarding the third application server connected to the third base station apparatus.

* * * * *